(12) United States Patent
Kristensson et al.

(10) Patent No.: US 7,706,616 B2
(45) Date of Patent: Apr. 27, 2010

(54) SYSTEM AND METHOD FOR RECOGNIZING WORD PATTERNS IN A VERY LARGE VOCABULARY BASED ON A VIRTUAL KEYBOARD LAYOUT

(75) Inventors: Per-Ola Kristensson, Linkoping (SE);
Jingtao Wang, Albany, CA (US);
Shumin Zhai, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1028 days.

(21) Appl. No.: 10/788,639

(22) Filed: Feb. 27, 2004

(65) Prior Publication Data

US 2005/0190973 A1    Sep. 1, 2005

(51) Int. Cl.
*G06K 9/00*    (2006.01)

(52) U.S. Cl. .................. 382/187; 382/229; 715/268

(58) Field of Classification Search .............. 382/187, 382/229; 715/268
See application file for complete search history.

(56) References Cited

U.S. PATENT DOCUMENTS

| | | | |
|---|---|---|---|
| 5,454,046 A * | 9/1995 | Carman, II | 382/186 |
| 5,574,482 A * | 11/1996 | Niemeier | 345/173 |
| 5,953,541 A | 9/1999 | King et al. | 710/67 |
| 6,011,554 A | 1/2000 | King et al. | 345/811 |
| 6,286,064 B1 | 9/2001 | King et al. | 710/67 |
| 6,307,548 B1 | 10/2001 | Flinchem et al. | 345/811 |
| 6,788,815 B2 * | 9/2004 | Lui et al. | 382/187 |
| 2002/0071607 A1 * | 6/2002 | Kawamura et al. | 382/187 |

OTHER PUBLICATIONS

Milewski et al., "Medical Word Recognition Using a Computational Semantic Lexicon," Aug. 2002, Eighth International Workshop on Handwriting Recognition, IEEE Computer Society Press, Niagara-on-the-Lake, Canada, pp. 401-406.*

(Continued)

*Primary Examiner*—Charles Kim
*Assistant Examiner*—John W Lee
(74) *Attorney, Agent, or Firm*—Samuel A. Kassatly; Jon A. Gibbons; Fleit, Gibbons, Gutman, Bongini & Bianco P.L.

(57) ABSTRACT

A word pattern recognition system based on a virtual keyboard layout combines handwriting recognition with a virtual, graphical, or on-screen keyboard to provide a text input method with relative ease of use. The system allows the user to input text quickly with little or no visual attention from the user. The system supports a very large vocabulary of gesture templates in a lexicon, including practically all words needed for a particular user. In addition, the system utilizes various techniques and methods to achieve reliable recognition of a very large gesture vocabulary. Further, the system provides feedback and display methods to help the user effectively use and learn shorthand gestures for words. Word patterns are recognized independent of gesture scale and location. The present system uses language rules to recognize and connect suffixes with a preceding word, allowing users to break complex words into easily remembered segments.

39 Claims, 14 Drawing Sheets

OTHER PUBLICATIONS

Zhai et al., "Performance Optimization of Virtual Keyboards, Human-Computer Interaction," 2002, Lawerence Erlbaum Associates, Inc., vol. 17, pp. 89-129.*

Zhai et al., "Shorthand Writing on Stylus Keyboard," 2003, ACM Conference on Human Factors in Computing Systems, CHI Letters 5(1), (Fort Lauderdale, Florida, 2003), pp. 97-104.*

Milewski et al., "Medical word Recognition using a computational semantic lexicon," Aug. 6-8, 2002, IEEE, pp. 401-406.*

Kristensson Per-Ola, "Degisn and Evaluation of a Shorthand Aided Soft Keyboard," Aug. 8, 2002, Linkoping University.*

S. Zhai M. Hunter & B.A. Smith, "Performance Optimization of Virtual Keyboards, Human-Computer Interaction," vol. 17 (2, 3), 229-270, 2002. http://www.almaden.ibm.com/u/zhai/papers/ZhaiHunterSmithHCIGalley.pdf.

D. Goldberg, C. Richardsson, "Touch-typing with a stylus," Proc. CHI. 1993, pp. 80-87.

K. Perlin, "Quikwriting: continuous stylus-based text entry," Proc. UIST. 1998, pp. 215-216.

Montgomery, E.B. (1982), "Bringing manual input into the 20th century: New Keyboard concepts." Computer, Mar. 1982, pp. 11-18.

J. Mankoff, and G. D. Abowd, "Cirrin: a word-level unistroke keyboard for pen input". Proc. UIST. 1998, pp. 213-214.

G. Kurtenbach, and W. Buxton, "User Learning and Performance with Marking Menus," Proc. CHI. 1994, pp. 258-264. http://www.billbuxton.com/MMUserLearn.html.

Kurtenbach, A. Sellen, and W. Buxton, "An Empirical Evaluation of Some Articulatory and Cognitive Aspects of "Marking Menus"," Human Computer Interaction, 1993, 8(1), pp. 1-23. http://www.billbuxton.com/PieMenus.html.

D. Venolia, and F. Neiberg, "T-Cube: A fast, self-disclosing pen-based alphabet", Proc. CHI. 1994, pp. 265-270.

D. J. Ward, A. F. Blackwell, and D. J. C. MacKay. "Dasher—a data entry interface using continuous gestures and language models", Proc. UIST. 2000, pp. 129-137.

Zhai, S. and Kristensson, P.-O., Shorthand Writing on Stylus Keyboard. in CHI 2003, ACM Conference on Human Factors in Computing Systems, CHI Letters 5(1), (Fort Lauderdale, Florida, 2003), ACM. http://www.almaden.ibm.com/u/zhai/papers/SharkFinal.pdf.

Tappert, C.C., "Speed, accuracy, flexibility trade-offs in on-line character recognition", Research Report RC13228, Oct. 28, 1987, IBM T.J. Watson Research Center, 1987.

Charles C. Tappert, Ching Y. Suen, Toru Wakahara, "The State of the Art in On-Line Handwriting Recognition," IEEE Transactions on Pattern Analysis and Machine Intelligence, vol. 12, No. 8, Aug. 1990. http://csdl.computer.org/comp/trans/tp/1990/08/i0787abs.htm.

Theodoridis, K., and Koutroumbas, K. "Pattern Recognition," Academic Press., Chapter 7, pp. 244-267, 1999.

Duda, R. O., and Hart, P. E., "Pattern Classification and Scene Analysis," John Wiley & Sons, Chapter 9, pp. 328-341, 1973.

Accot, J., and Zhai, S., "More than dotting the i's—foundations for crossing-based interfaces," Proc. CHI. 2002, pp. 73-80. http://www.almaden.ibm.com/u/zhai/papers/AccotZhai2002.pdf.

Zhai, S., Sue, A., and Accot, J., "Movement model, hits distribution and learning in virtual keyboarding," Proc. CHI. 2002., pp. 17-24. http://www.almaden.ibm.com/u/zhai/papers/ZhaiSueAccot2002.pdf.

H. Levkowitz, et al., "The Design and Evaluation of Color Scales for Image Data," IEEE Computer Graphics and Applications, vol. 12, 1, pp. 72-80, 1992.

* cited by examiner

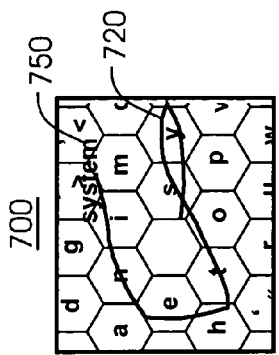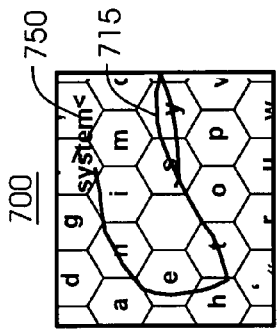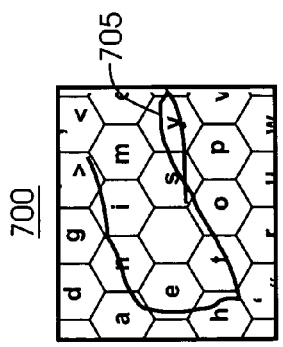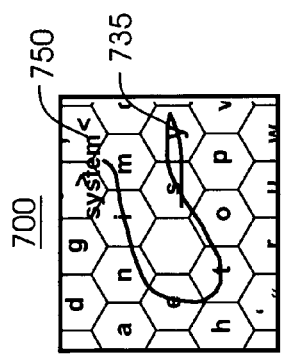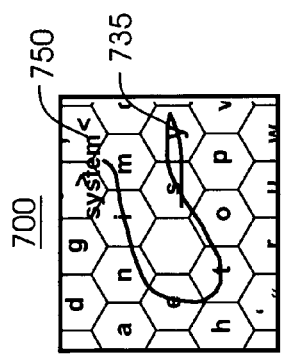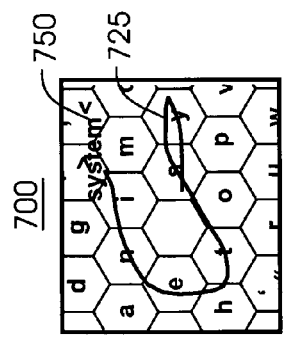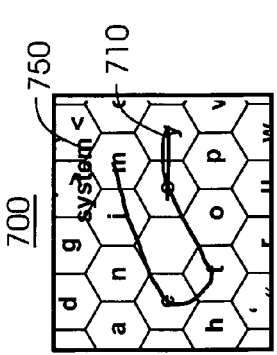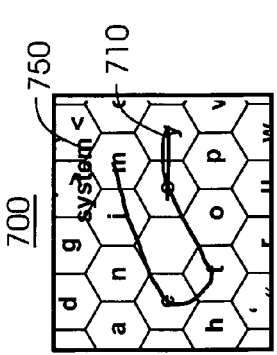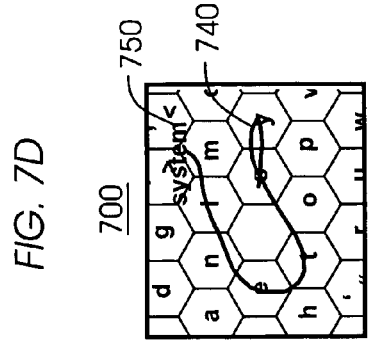

SYSTEM AND METHOD FOR RECOGNIZING WORD PATTERNS IN A VERY LARGE VOCABULARY BASED ON A VIRTUAL KEYBOARD LAYOUT

CROSS-REFERENCE TO RELATED APPLICATION

The present application relates to co-pending U.S. patent application titled "System and Method for Recognizing Word Patterns Based on a Virtual Keyboard Layout," Ser. No. 10/325,197, which was filed on Dec. 20, 2002, and which is incorporated herein by reference.

FIELD OF THE INVENTION

The present invention generally relates to text entry devices for computers, particularly text entry via virtual keyboards for computer-based speed writing that augment stylus keyboarding with shorthand gesturing. Shorthand gestures for words are defined as the stroke sequentially formed by the user after the pattern defined by all the letters in a word on a virtual keyboard.

BACKGROUND OF THE INVENTION

Text input constitutes one of the most frequent computer user tasks. The QWERTY keyboard has been accepted as the standard tool for text entry for desktop computing. However, the emergence of handheld and other forms of pervasive or mobile computing calls for alternative solutions. These devices have small screens and limited keypads, limiting the ability of the user to input text. Consequently, text input has been revived as a critical research topic in recent years. The two classes of solutions that have attracted the most attention are handwriting and stylus-based virtual keyboarding.

Handwriting is a rather "natural" and fluid mode of text entry due to the prior experience of the user. Various handwriting recognition systems have been used in commercial products. However, the fundamental weakness of handwriting as a text entry method is its limited speed. While adequate for entering names and phone numbers, handwriting is too limited for writing longer text.

Virtual keyboards tapped serially with a stylus are also available in commercial products. The keyboard provided on the screen is typically the familiar QWERTY layout. Stylus keyboarding requires intense visual attention at every key tap, preventing the user from focusing attention on text output. To improve movement efficiency, optimization of the stylus keyboard layout has been considered both by trial and error and algorithmically. Using a keyboard layout such as ATOMIK (Alphabetically Tuned and Optimized Mobile Interface Keyboard), text entry is relatively faster. Reference is made to S. Zhai, M. Hunter & B. A. Smith, "Performance Optimization of Virtual Keyboards, Human-Computer Interaction," Vol. 17(2, 3), 229-270, 2002.

The need for entering text on mobile devices has driven numerous inventions in text entry in recent years. The idea of optimizing gesture for speed is embodied in the Unistrokes alphabet. In the Unistrokes alphabet, every letter is written with a single stroke but the more frequent ones are assigned simpler strokes. If mastered, a user can potentially write faster in the Unistrokes alphabet than in the Roman alphabet. The fundamental limitation of the Unistrokes alphabet, however, is the nature of writing one character at a time. Reference is made to D. Goldberg, C. Richardsson, "Touch-typing with a stylus," Proc. CHI. 1993, pages 80-87. Reference is also made to U.S. Pat. No. 6,654,496.

Quikwriting method uses continuous stylus movement on a radial layout to enter letters. Each character is entered by moving the stylus from the center of the radial layout to one of the eight outer zones, sometimes crossing to another zone, and returning to the center zone. The stylus trajectory determines which letter is selected. While it is possible to develop "iconic gestures" for common words like "the", such gestures are relatively complex because the stylus has to return to the center after every letter. In this sense, the Quikwriting method is fundamentally a character entry method. Reference is made to K. Perlin, "Quikwriting: continuous stylus-based text entry," Proc. UIST. 1998, pages 215-216.

A design has been proposed to rearrange the keyboard layout so that some common short words or word fragments can be wiped through, rather than pressed character by character. This method did not involve pattern recognition and shorthand production, so only characters in the intended word can be wiped through in the correct sequence. This design estimates that it would take about 0.5 motion per character. Reference is made to "Montgomery, E. B., "Bringing manual input into the 20th century: New Keyboard concepts," Computer, Mar. 11-18, 1982, and U.S. Pat. No. 4,211,497.

Cirrin (Circular Input) operates on letters laid out on a circle. The user draws a word by moving the stylus through the letters. Cirrin explicitly attempts to operate on a word level, with the pen being lifted up at the end of each word. Cirrin also attempts to optimize pen movement by arranging the most common letters closer to each other. However, Cirrin is neither location nor scale independent. It does not uses word pattern recognition as the basic input method. Reference is made to J. Mankoff and G. D. Abowd, "Cirrin: a word-level unistroke keyboard for pen input". Proc. UIST. 1998, pages 213-214.

It is important to achieve at least partial scale and location independency for the ease and speed of text entry. If all the letters defining a word on the keyboard have to be precisely crossed, the time and visual attention demand to trace these patterns is undesirable.

It is also important to facilitate skill transfer from novice behavior to expert performance in text entry by designing similar movement patterns for both types of behavior. The idea of bridging novice and expert modes of use by common movement pattern is used in the "marking menu". Instead of having pull-down menus and shortcut keys, two distinct modes of operation for novice and expert users respectively, a marking menu uses the same directional gesture on a pie menu for both types of users. For a novice user whose action is slow and needs visual guidance, marking menu "reveals" itself by displaying the menu layout after a pre-set time delay. For an expert user whose action is fast, the marking menu system does not display visual guidance. Consequently, the user's actions become open loop marks. However, the marking menu is not used for text entry due to the limited number of items can be reliably used in each level of a pie menu (8 or at the most 12). Reference is made to G. Kurtenbach, and W. Buxton, "User Learning and Performance with Marking Menus," Proc. CHI. 1994, pages 258-264; and G. Kurtenbach, A. Sellen, and W. Buxton, "An Empirical Evaluation of Some Articulatory and Cognitive Aspects of "Marking Menus", Human Computer Interaction, 1993, 8(1), pages 1-23.

A self-revealing menu approach, T-Cube, defines an alphabet set by cascaded pie menus that are similar to a marking menu. A novice user enters characters by following the visual guidance of menus, while an expert user can enter the individual characters by making menu gestures without visual display. A weakness of the T-Cube is that it works at alphabet level; consequently, text entry using T-cube is inherently slow. Reference is made to D. Venolia and F. Neiberg, "T-Cube: A fast, self-disclosing pen-based alphabet", Proc. CHI. 1994, pages 265-270.

Dasher, another approach using continuous gesture input, dynamically arranges letters in multiple columns. Based on preceding context, likely target letters appear closer to the user's cursor location. A letter is selected when it passes through the cursor; consequently, cursor movement is minimized. This minimization, however, is at the expense of visual attention. Because the letter arrangement constantly changes, Dasher demands user's visual attention to dynamically react to the changing layout. Reference is made to D. J. Ward, A. F. Blackwell, and D. J. C. MacKay. "Dasher—a data entry interface using continuous gestures and language models", Proc. UIST. 2000, pages 129-137.

One possibility for introducing gesture-based text entry is the use of shorthand. Traditional shorthand systems are efficient, but hard to learn for the user and difficult to recognize by the computer. Shorthand has no duality; it cannot be used by experts and beginners alike. In addition, shorthand has no basis in a virtual keyboard, so the user cannot identify the required symbol from the keyboard. If the user forgets shorthand symbols, a separate table must be consulted to find the symbol.

One recent approach comprises a form of continuous gesture-based text input that requires minimal visual attention. This approach is based on keyboard entry, recognizing word patterns based on a virtual keyboard layout. Handwriting recognition is combined with a virtual, graphical, or on-screen keyboard to provide a text input method with relative ease of use. The system allows the user to input text quickly with little or no visual attention from the user. Reference is made to Zhai, S. and Kristensson, P.-O., "Shorthand Writing on Stylus Keyboard," CHI 2003, ACM Conference on Human Factors in Computing Systems, CHI Letters 5(1), (Fort Lauderdale, Fla., 2003), ACM."

Although this gesture-based text input system has proven to be useful, it is desirable to present additional improvements. A gesture-based text input system with a larger vocabulary of gestures recognizable as words is desired. In addition, a method for identifying the appropriate word among the larger gesture vocabulary is desired. Further, a method for enhancing user learning that accelerates the acquisition and use of gestures to speed text input is desired. The need for such system and method has heretofore remained unsatisfied.

SUMMARY OF THE INVENTION

The present invention satisfies this need, and presents a system and associated method (collectively referred to herein as "the system" or "the present system") for recognizing word patterns based on a virtual keyboard layout. The present system combines hand writing recognition with a virtual, graphical, or on-screen keyboard to provide a text input method with relative ease of use. The system allows the user to input text quickly with much less visual attention from the user than tapping on virtual keyboard. The present system supports practically all words needed for a particular user (e.g. 20,000 words) with the gesture mode only. In addition, the present system utilizes various techniques and methods to achieve reliable recognition of a very large gesture vocabulary. As used herein, the term "very large vocabulary" refers to a vocabulary that is sufficiently large to cover approximately 95% of the words a user needs in an application for which the present invention is used. As an example only, a very large vocabulary could include 10,000 words or more.

In addition, the present system provides feedback and display methods to help the user to use and learn the system effectively. The present system uses language rules to recognize suffixes and connect suffixes with a preceding word, allowing users to break complex words into easily remembered segments.

For word pattern gesturing to be effective, patterns have to be to some extent recognized independent of scale and location. This is especially critical for small device screens or virtual keyboards such as those on a PDA. As long as the user produces a pattern in the present system that matches the shape of the word pattern defined on the keyboard layout, the present system recognizes and types the corresponding word for the user. Consequently, the users can produce these patterns with much less visual attention, in a more open-loop fashion, and with presumably greater ease and comfort.

In comparison to writing alphabetic or logographic characters such as Chinese by hand, writing a word pattern defined by a stylus keyboard can be much more efficient. Each letter constitutes only one straight stroke and the entire word is one shape. In other words, the present system is a form of shorthand writing.

The present system can be defined on an input device, such as any keyboard layout. In one embodiment, the gestures are defined on the familiar QWERTY layout. With this layout, frequent left-right zigzag strokes are required because the commonly used consecutive keys are deliberately arranged on the opposite sides of QWERTY. An alternative keyboard layout is the ATOMIK (Alphabetically Tuned and Optimized Mobile Interface Keyboard) layout. The ATOMIK keyboard layout is optimized to reduce movement from one key to another; consequently, it is also optimized for producing word patterns of minimum length. Reference is made to Zhai, S., Smith, B. A., and Hunter, "M. Performance Optimization of Virtual Keyboards," Human-Computer Interaction, 17 (2, 3), pp 89-129, 2002.

A user's repertoire of shorthand gesture symbols can be gradually expanded with practice with the present system, providing a gradual and smooth transition from novice to expert behavior. When the user is not familiar with the gesture of a word, the user is expected to trace the individual letters one at a time, guided by visual recognition of individual letter positions on a virtual keyboard. Over time, the user partly (and increasingly) remembers the shape of the gesture and partly relies on visual feedback. Eventually, the user shifts from visually based tracing to mostly memory recall based gesture production. As is common in human performance, recall-based performance tends to be faster than visual feedback-based performance.

The user's production of a gesture of a word is location dependent to a varying degree. Even if the user remembers the shape of the gesture of a word, he may still draw that shape approximately where the letters are on the keyboard, particularly where the first letter of the word is on the keyboard. For word gestures that the user cannot recall, the gesture based on tracing the letters is typically location dependent.

From system recognition point of view, gesture shape information alone may or may not uniquely determine the word the user intends. For example, the gesture defined by c-o-m-p-u-t-e-r only matches to the word "computer" regardless where the gesture is drawn on the keyboard. In contrast, a simple word such as the word "can" shares the same gesture shape as the word "am" on an ATOMIK keyboard; both are a single straight line.

To maximize the flexibility as well as efficiency for the user, the present system uses multiple channels of information to recognize the intended word. The present system treats different aspects of the pattern classification process as different channels. These channels may be parallel or serial depending on the nature of their contribution. The most basic channels of information are shape and location. Several other factors can also contribute the overall likelihood of a word, such as the language context (proceeding words), etc.

The present system can be extended with more channels, further improving the overall accuracy of the present system. The present system may be extended with a dynamic channel weighting function that uses human motor laws to calculate the plausibility of the user relying on either location or shape information. For example, a user drawing a shape gesture very slowly would indicate that the user is producing a stroke by looking at the corresponding keys on the layout; hence the location channel should have more weight than the shape channel and vice versa.

The present system may be used with any application using a virtual keyboard or electronic input with stylus. Such applications may be PDAs, electronic white boards, cellular phones, tablet computers, digital pens, etc., Additionally, the present system may be used with any application using a shorthand gesture on a graphical input tablet such as, for example, court reporting machines, dictation systems, etc.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 5 is comprised of FIGS. 5A, 5B, and 5C that illustrate diagrams of a keyboard illustrating the performance of the tunnel model channel of the word pattern recognition system of FIGS. 1 and 2; wherein FIG. 5A shows the virtual tunnel for the word "think" on a virtual keyboard; wherein FIG. 5B illustrates a valid gesture that passes through this virtual tunnel and is recognized as "think" by the tunnel model; and wherein

FIG. 7 is comprised of FIGS. 7A, 7B, 7C, 7D, 7E, 7F, 7G, 7H, and 7I, and represents the transformation or morphing of a shorthand gesture to a template representation of the same word by the word pattern recognition system of FIGS. 1 and 2; and FIG. 8 is comprised of FIGS. 8A, 8B, 8C, 8D, and 8E, and represents a process flow chart that illustrates a method of operation of the word pattern recognition system of FIGS. 1 and 2; wherein FIGS. 8D and 8E are detailed illustrations of the two-stage fast matching algorithm used by a tunnel model to determine the desired result from a large vocabulary list; wherein FIG. 8D shows the first stage and generates a small candidate list efficiently by partial string matching; and wherein FIG. 8E shows the second step of the tunnel model, i.e., verifying the candidate by checking whether all of the points in a gesture falls into the virtual tunnel.

DETAILED DESCRIPTION OF PREFERRED EMBODIMENTS

The following definitions and explanations provide background information pertaining to the technical field of the present invention, and are intended to facilitate the understanding of the present invention without limiting its scope:

ATOMIK—Alphabetically Tuned and Optimized Mobile Interface Keyboard, is a keyboard layout that is optimized by an algorithm in which the keyboard was treated as a "molecule" and each key as an "atom". The atomic interactions among the keys drive the movement efficiency toward the maximum. Movement efficiency is defined by the summation of all movement times between every pair of keys weighted by the statistical frequency of the corresponding pair of letters. ATOMIK is also alphabetically tuned, causing a general tendency that letters from A to Z run from the upper left corner to the lower right corner of the keyboard, helping users find keys that are not yet memorized. ATOMIK is one exemplary virtual keyboard that can be used in combination with the present invention.

Elastic Matching: A conventional hand writing recognition method. Reference is made to Tappert, C. C., "Speed, accuracy, flexibility trade-offs in on-line character recognition", Research Report RC13228, Oct. 28, 1987, IBM T.J. Watson Research Center, 1987; and Charles C. Tappert, Ching Y. Suen, Toru Wakahara, "The State of the Art in On-Line Handwriting Recognition," IEEE Transactions on Pattern Analysis and Machine Intelligence, Vol. 12, No. 8, August 1990.

PDA: Personal Digital Assistant. A pocket-sized personal computer. PDAs typically store phone numbers, appointments, and to-do lists. Some PDAs have a small keyboard, others have only a special pen that is used for input and output on a virtual keyboard.

Virtual Keyboard: A computer simulated keyboard with touch-screen interactive capability that can be used to replace or supplement a keyboard using keyed entry. The virtual keys are typically tapped serially with a stylus. It is also called graphical keyboard, on-screen keyboard, or stylus keyboard.

Figure 1:
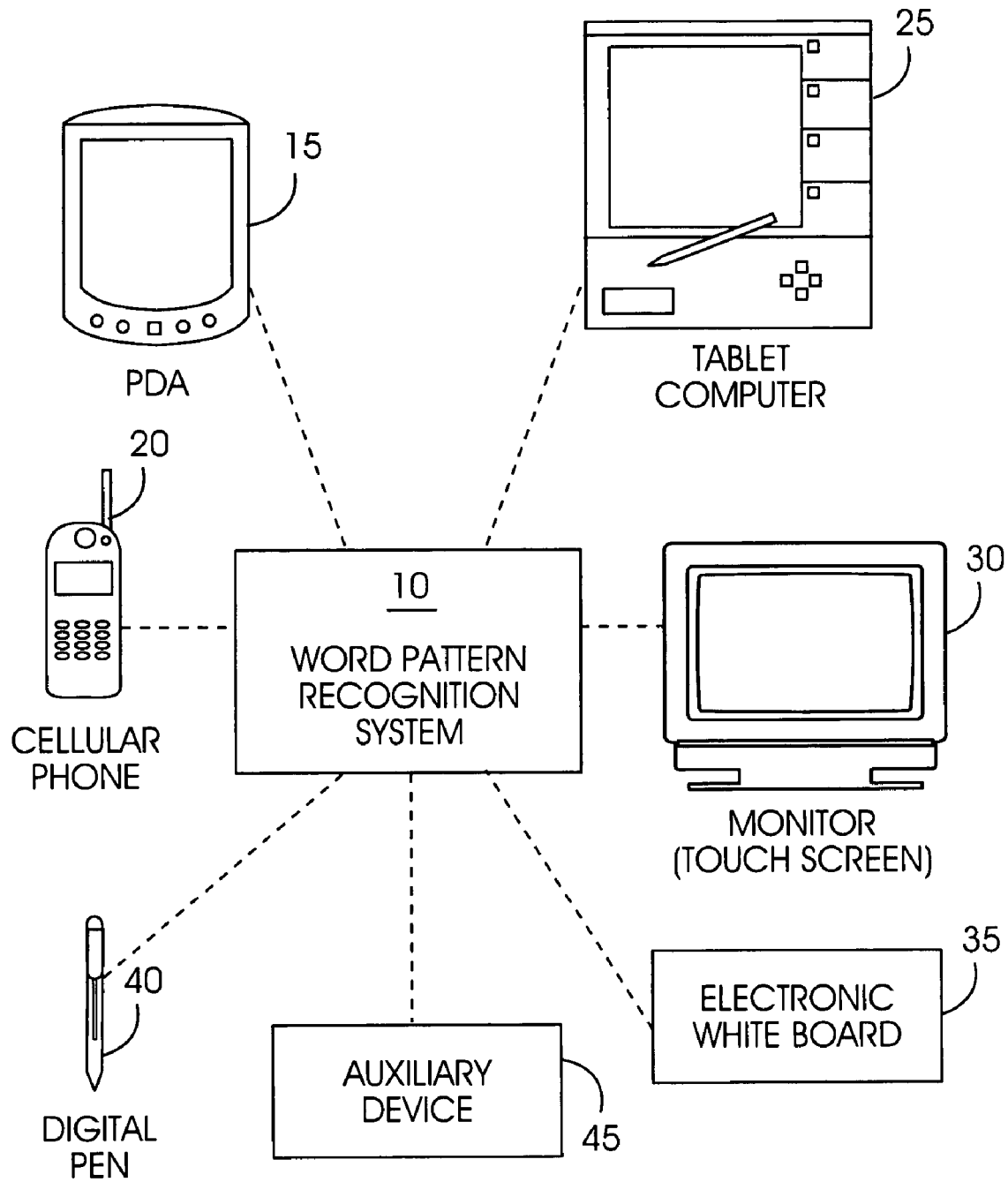
FIG. 1 is a schematic illustration of an exemplary operating environment in which a word pattern recognition system of the present invention can be used.

FIG. 1 portrays an exemplary overall environment in which a word pattern recognition system 10 and associated method 800 for recognizing word patterns on a virtual keyboard according to the present invention may be used. The word pattern recognition system 10 includes software programming code or a computer program product that is typically embedded within, or installed on a computer. The computer in which the word pattern recognition system 10 is installed can be mobile devices such as a PDA 15 or a cellular phone 20. In addition, the word pattern recognition system 10 can be installed in devices such as tablet computer 25, touch screen monitor 30, electronic white board 35, and digital pen 40.

The word pattern recognition system 10 can be installed in any device using a virtual keyboard or similar interface for entry, represented by auxiliary device 45. Alternatively, the word pattern recognition system 10 can be saved on a suitable storage medium such as a diskette, a CD, a hard drive, or like devices.

Figure 2:
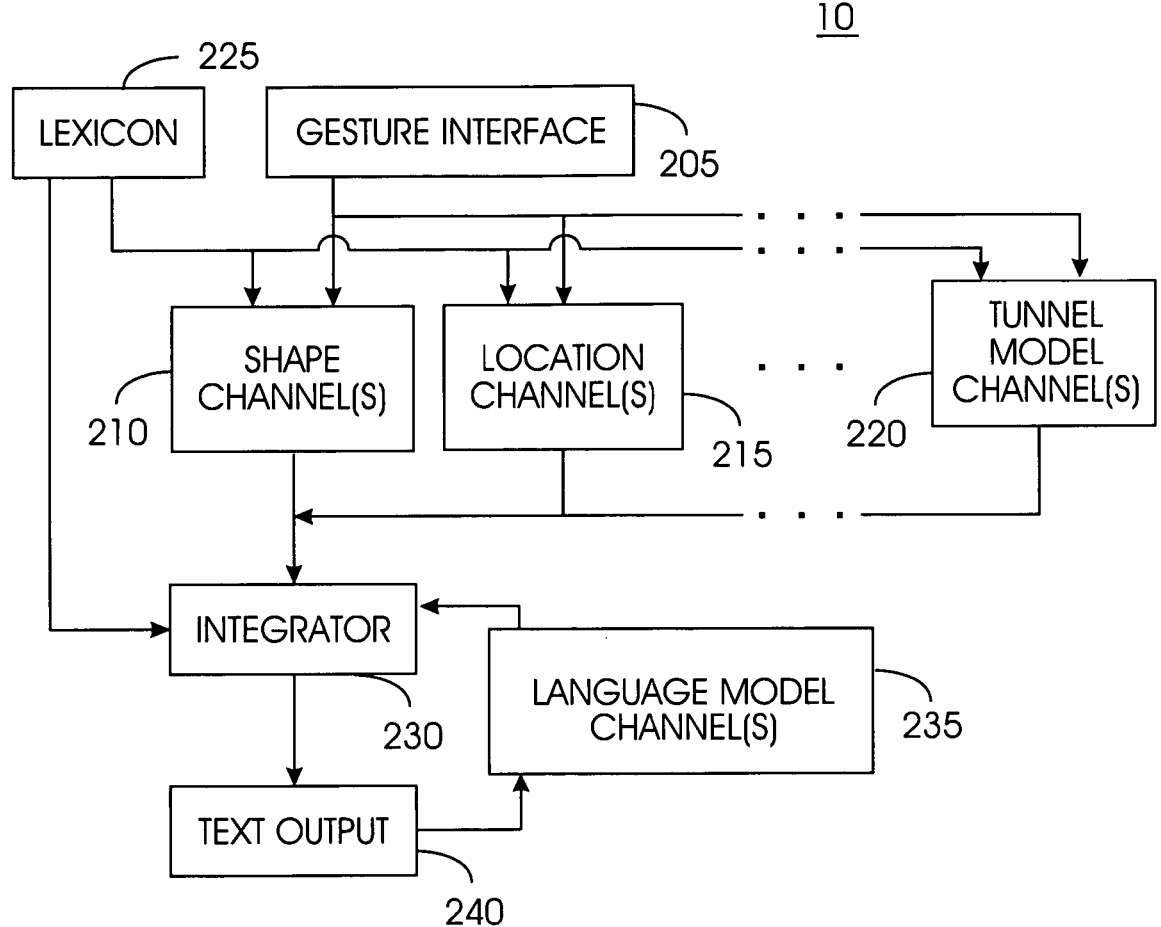
FIG. 2 is a block diagram of a high-level hierarchy of the word pattern recognition system of FIG. 1.

A high-level hierarchy of the word pattern recognition system 10 is illustrated by the block diagram of FIG. 2. The word pattern recognition system 10 comprises a gesture interface 205 to capture a shorthand gesture of the user on, for example, a virtual keyboard interface. The gesture interface 205 supplies the captured shorthand gesture to a shape channel 210, a location channel 215, and a tunnel model channel 220 for analysis. In an embodiment, additional shape channels 210, location channels 215, and tunnel model channels 220 may be used to analyze the captured shorthand gesture. In a further embodiment, one or more other channels may be used to analyze the captured shorthand gesture.

The shape channel 210, the location channel 215, and the tunnel model channel 220 analyze the captured shorthand gesture to recognize the word intended by the user. The shape channel 210, the location channel 215, and the tunnel channel 220 each compare the results of analysis with a word gesture database stored in lexicon 225. Potential words determined by the shape channel 210, the location channel 215, and the tunnel model channel 220 are sent to an integrator 230.

The language model channel 235 provides context clues to the integrator 230 based on previous words gestured by the user. Integrator 230 analyzes the potential words provided by the shape channel 210, the location channel 215, and the tunnel model channel 220 with context clues from the language model channel 235 to produce text output 240.

Figure 3:
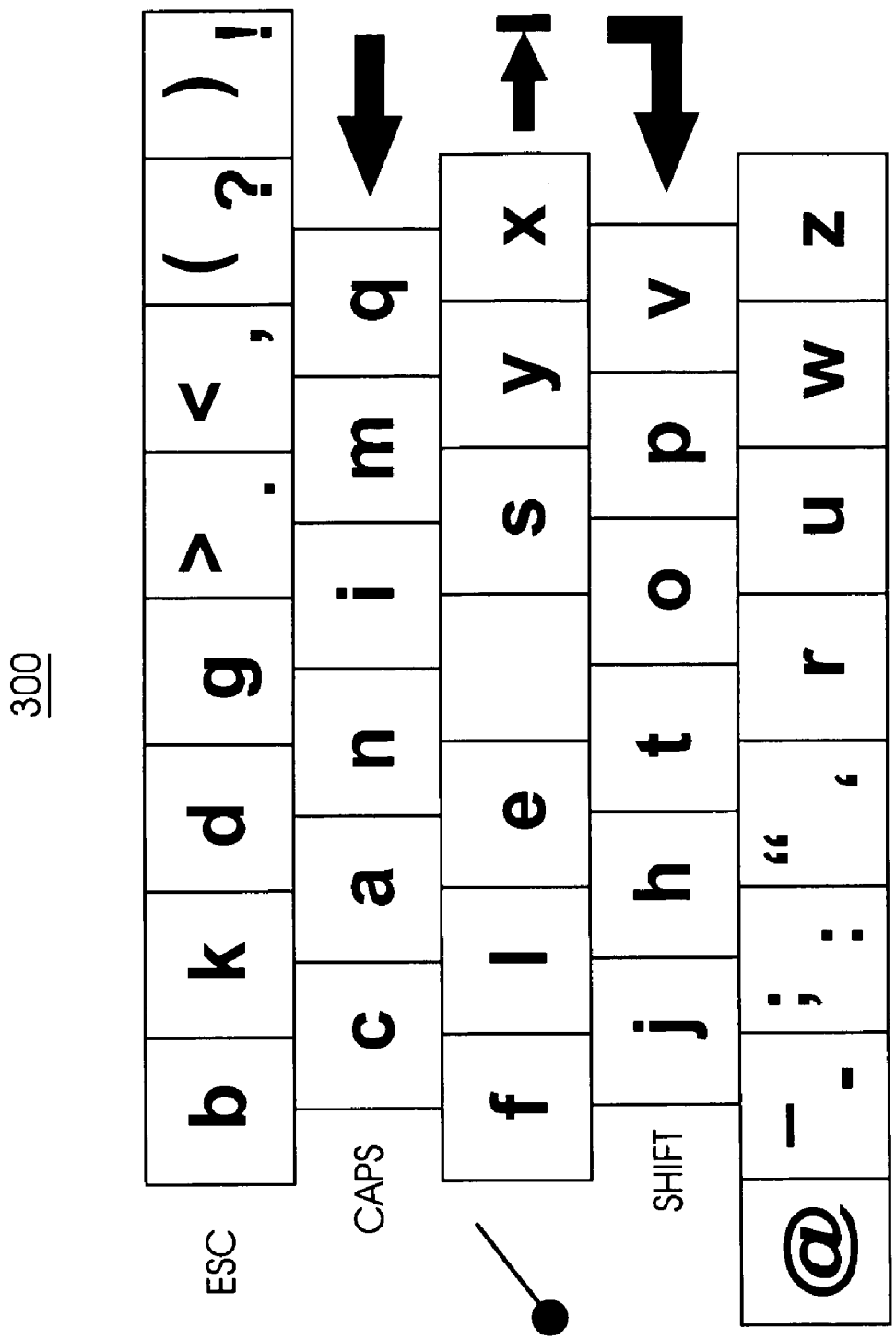
FIG. 3 is an exemplary virtual keyboard layout that can be used with the word pattern recognition system of FIGS. 1 and 2.
Figure 4A:
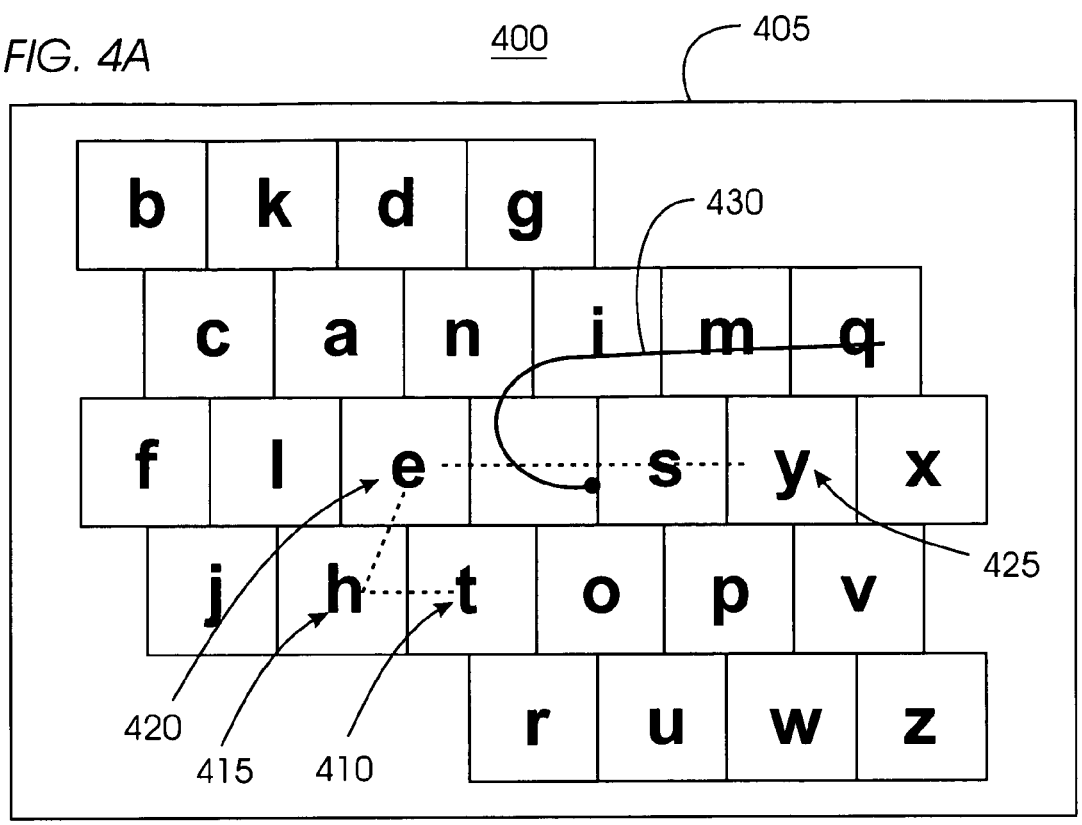
FIG. 4 is comprised of FIGS. 4A and 4B, and represents a screen shot of a virtual keyboard using the word pattern recognition system of FIG. 1 illustrating the input of the word "they"
Figure 4B:
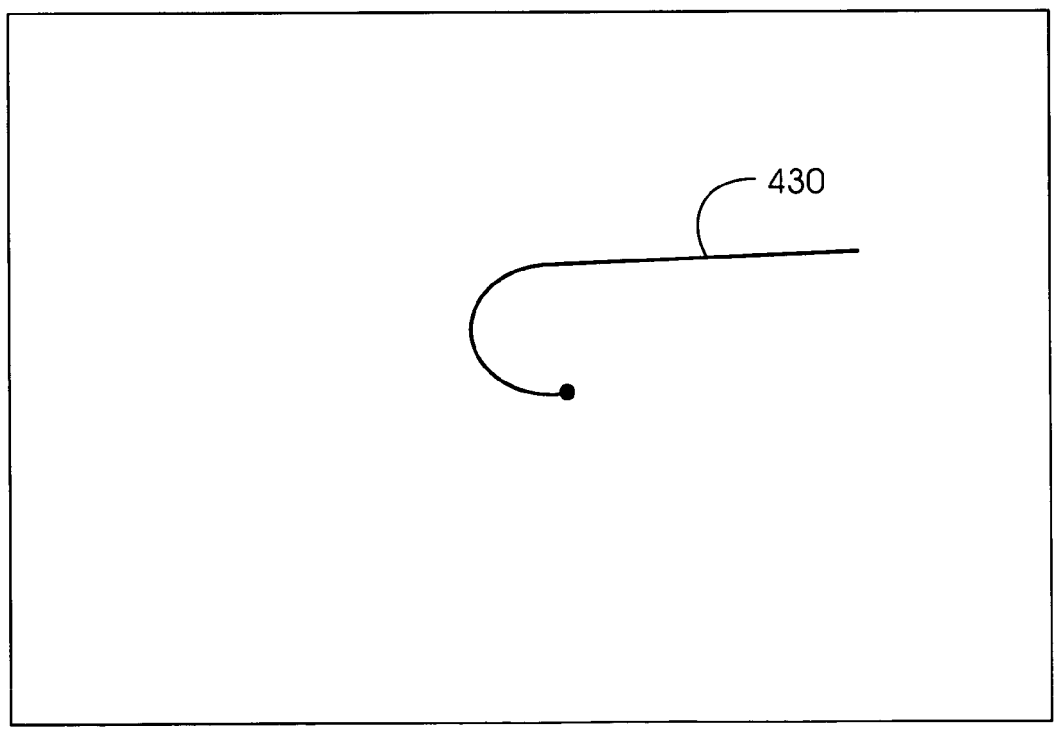

FIG. 3 illustrates an exemplary virtual keyboard 300 such as the ATOMIK keyboard on which the word pattern recognition system 10 can interpret shorthand gestures as words. FIG. 4 (FIGS. 4A, 4B) further illustrates the use of the word pattern recognition system 10. As seen in the screenshot 400 of a virtual keyboard system operating with the word pattern recognition system 10, the user is presented with a virtual keyboard such as the ATOMIK keyboard 405. The user wishes to enter the word "they". The user places a stylus on the virtual key "t" 410 and moves the stylus through the remaining letters of the word ("h" 415, "e" 420, and y "425") without lifting the stylus from the virtual keyboard 405, forming the shorthand gesture 430. Eventually, the user does not need a keyboard for entry, simply entering the shorthand gesture 430 as shown in FIG. 4B.

The word pattern recognition system 10 provides scalability through recognition of a large number of the shorthand gestures. When presented with a shorthand gesture for a word not in the lexicon 225, the user can teach the word to the word pattern recognition system 10, saving the shorthand gesture and word to the lexicon 225. Several different algorithms and approaches can be used to recognize a word represented by a shorthand gesture. In a preferred embodiment, a modified elastic matching algorithm is used.

Elastic matching is a proven algorithm used in some cursive script and hand printed character recognition systems. The recognition algorithm of the word pattern recognition system 10 can be based on, for example, a classic elastic matching algorithm that computes the minimum distance between two sets of points by dynamic programming. One set of points is from the shape that a user produces on a stylus tablet or touch screen (i.e., an unknown shape). The other is from a prototype or template, i.e., an ideal shape defined by the letter key positions of a word. The recognition system can also be implemented by other hand writing recognition systems. Reference is made to "Charles C. Tappert, Ching Y. Suen, Toru Wakahara, "The State of the Art in On-Line Handwriting Recognition, IEEE Transactions on Pattern Analysis and Machine Intelligence," Vol. 12, No. 8, August 1990".

The modified elastic matching method is similar to the elastic matching algorithm as they both do not require any training and rely on an ordered discrete set of point coordinates to classify the pattern. In contrast to the elastic matching algorithm, the modified elastic matching method performs no stretching in the template comparison.

The gesture interface 205 performs scale transformation (normalization) and location transformation (normalization) on the shorthand gesture. The gesture interface 205 then interpolates the shorthand gesture to a fixed number of points at an equidistant interval. The shape channel 210 linearly compares these points to each other within the normalized shorthand gesture to extract specific shape features for the shorthand gesture. This comparison is performed using the spatial (Euclidean) distance (similar results can be achieved with squared distance). The sum of the point distances is the similarity score between the patterns, defined by $L_2$ Norm, or Euclidean distance:

$$x_s = \sum_i \|p(i)_{unknown} - p(i)_{template}\|_2 \quad (1)$$

The shape channel 210 repeats this process between the shorthand gesture and possible matching template patterns in lexicon 225. Since the comparison function is linear, this approach is feasible in practice even for a large template set. It is relatively easy to prune the template set since many template patterns can be discarded once part of the distance sum passes a certain threshold without any loss of recognition accuracy.

In an alternative embodiment, shape may be determined by matching feature vectors. A similarity score could be computed by extracting the relevant features and calculating the similarity between these individual feature vectors to get a distance measurement between the shorthand gesture and the template. For example, scale and translation invariant moments can be extracted from the shorthand gesture and the templates and be compared using a similarity metric such as the Mahalanobis distance or Euclidean distance. Reference is made to Theodoridis, K., and Koutroumbas, K., "Pattern Recognition," Academic Press, 1999, pp. 245-267.

Location recognition is performed by the location channel 215. The location channel 215 uses an interpolation technique if a corresponding point in the shorthand gesture does not exist. The location channel 215 then determines the cumulative sum of those distances. A weighting function is also applied to allow different weights for points depending on their order in the pattern. The result is a similarity score between the shorthand gesture and a template pattern mapped on the keyboard layout. An exemplary weighting function pays more attention to beginning and end points than points in the middle of the pattern. Other weighting functions can be used.

The word pattern recognition system 10 calculates the weighted average of the point-to-point distances as the output of the location channel 215 as $x_l(i)$ for word i (location mismatch):

$$x_l(i) = \sum_{k=0}^{N} \alpha(k) d_2(k) \qquad (2)$$

where α(k) is the relative weight placed on the k th letter (0 to N). The following linear function is an example of a weighting function:

$$\alpha(k) = \frac{N - k(1 - \beta)}{(1 + N)N - (1 - \beta)\sum_{k=1}^{N} k} \qquad (3)$$

Equation (3) is derived from the assumptions that equation (2) gives a weighted average, that the last letter weights a fraction of the first letter, and that a linear reduction in weight is assumed from the first letter to the last. Equation (2) gives a weighted average, therefore $$\alpha(0)+\alpha(1)+\ldots \alpha(k) \ldots +\alpha(N)=1 \qquad (4)$$

A user typically applies more visual attention to the beginning of a shorthand gesture than the end of a shorthand gesture. Consequently, the word pattern recognition system 10 weights the last letter at some fraction of the first letter, where β is the weighting factor:

$$\alpha(N)=\beta\alpha(0) \qquad (5)$$

Due to the typical reduction in attention from the beginning of the shorthand gesture to the end, the word pattern recognition system 10 also assumes a linear reduction in weight from the first letter to the last, where C is the linear weighting value:

$$\alpha(0)-\alpha(1)=C$$

$$\alpha(1)-\alpha(2)=C$$

$$\alpha(k)-\alpha(k-1)=C \qquad (6)$$

For example, when β=0.5, the ending position of the shorthand gesture counts as half of the starting location in terms of location constraint.

Figure 8A:
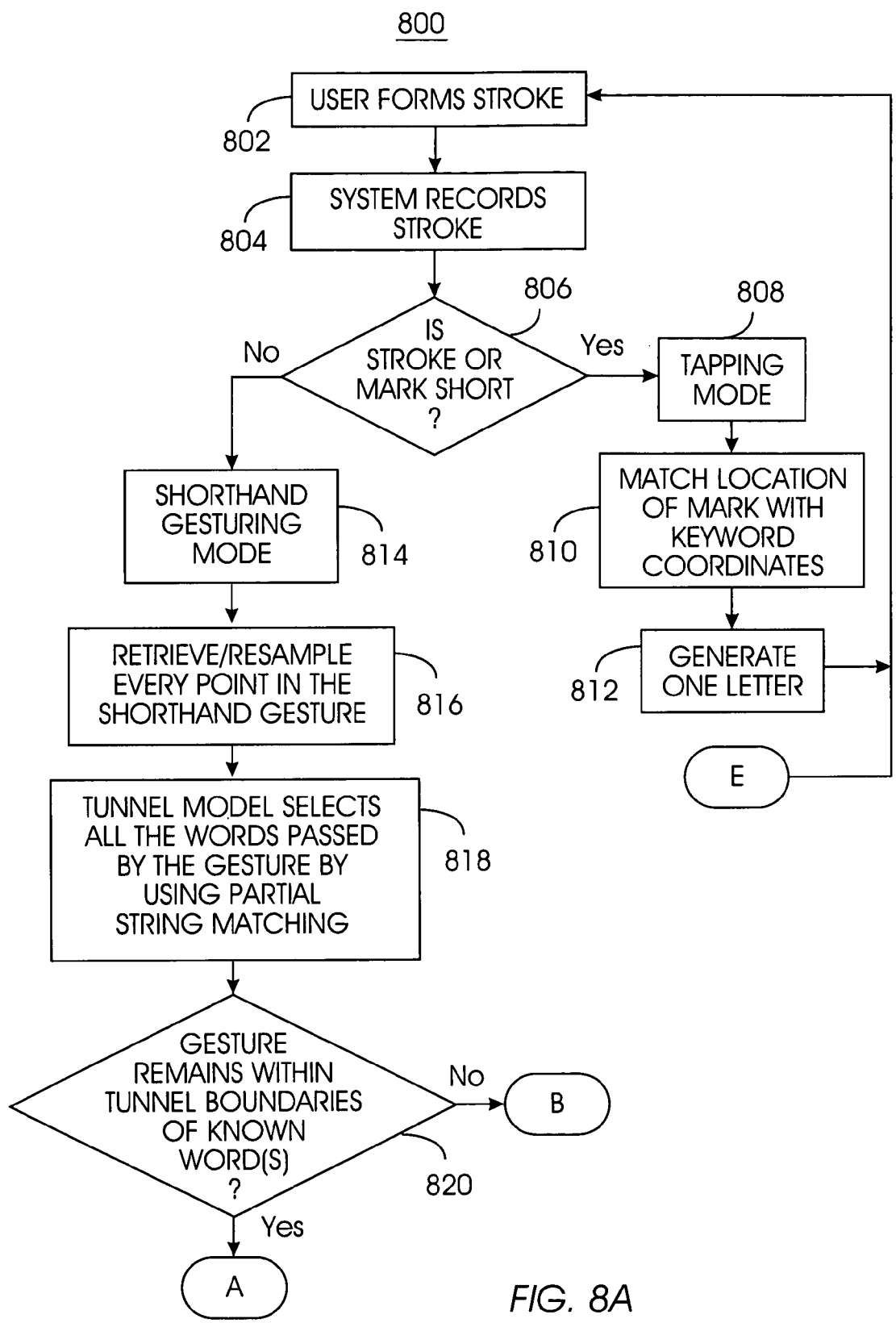
Figure 8B:
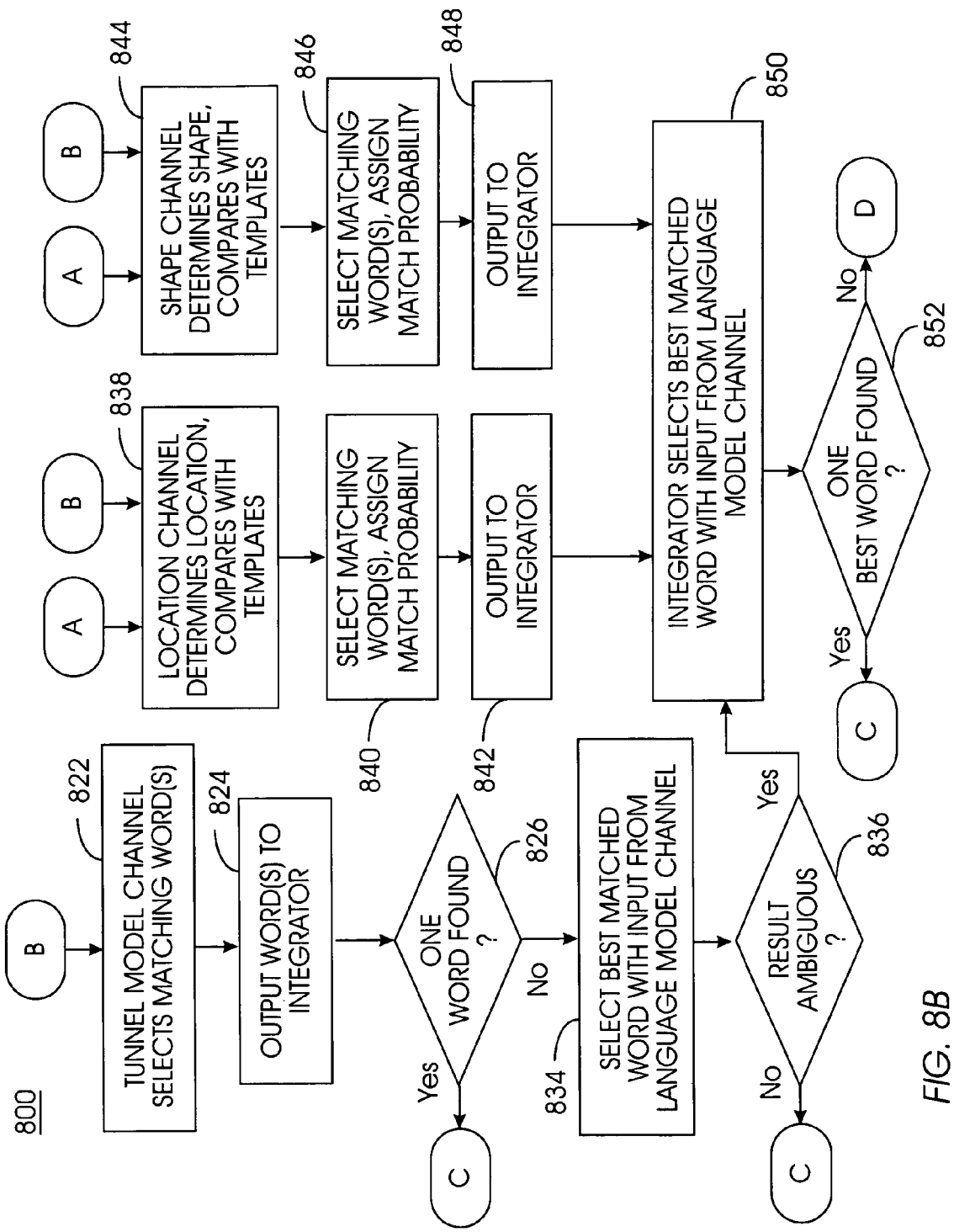
Figure 8C:
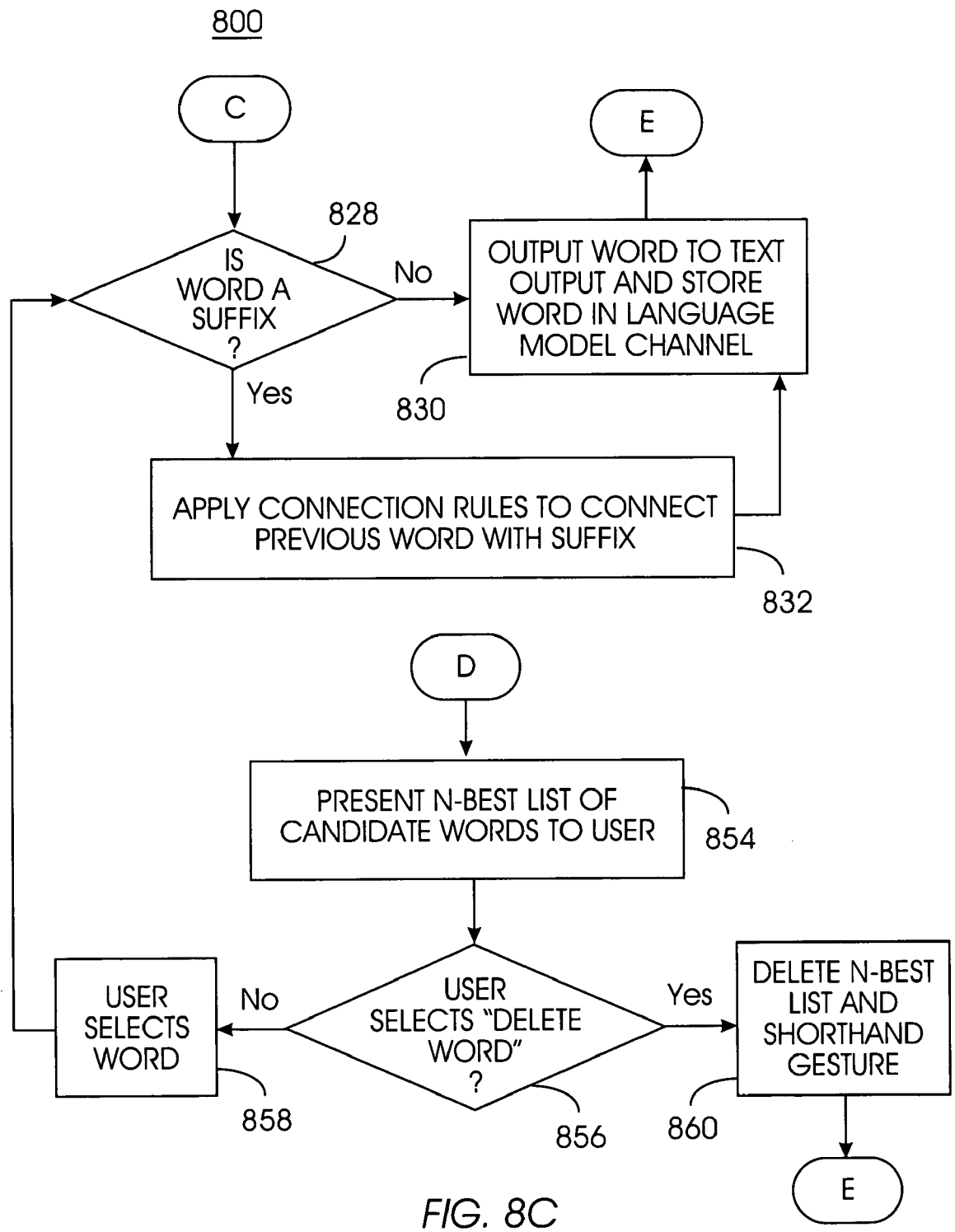
Figure 8D:
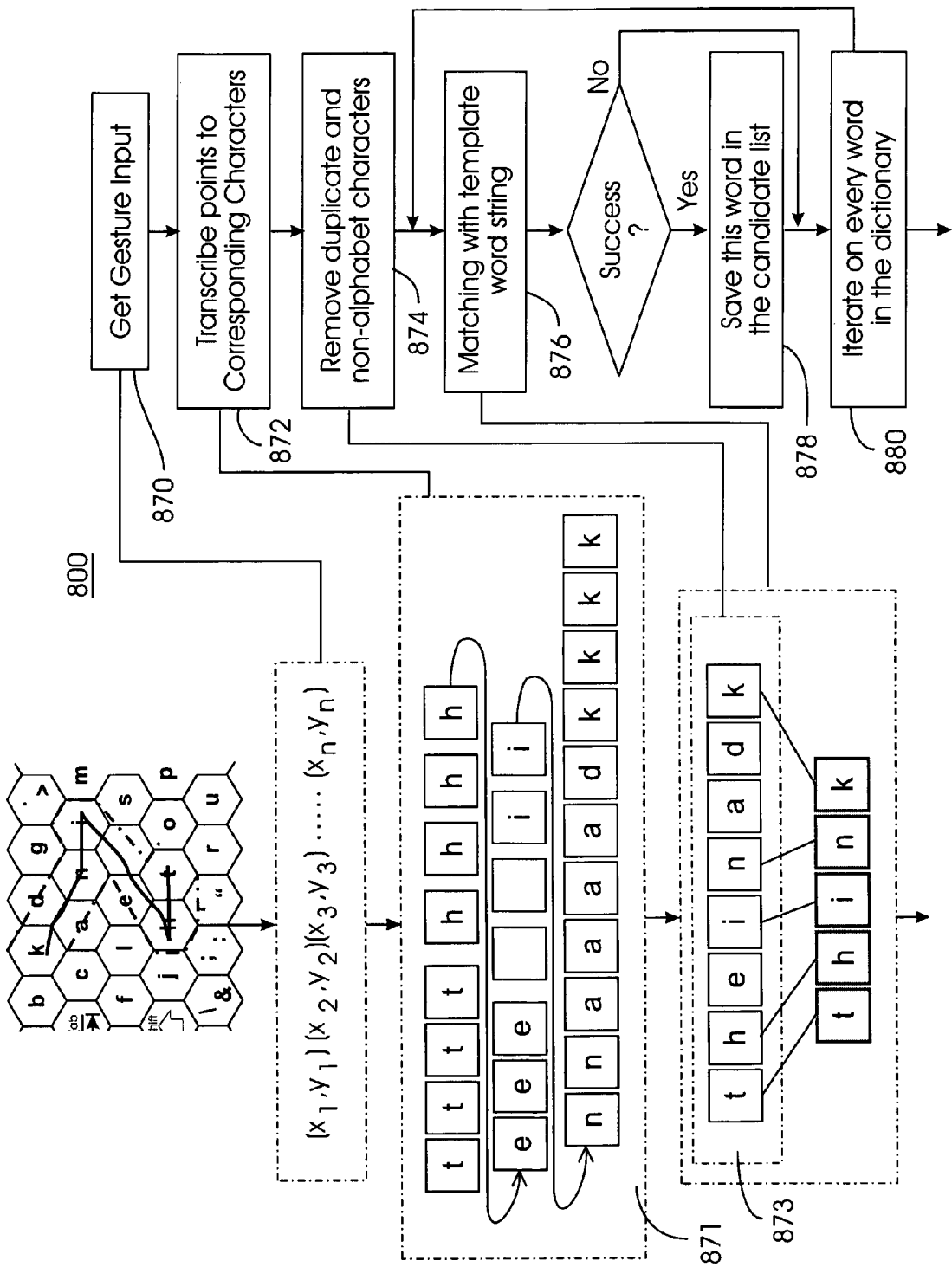
Figure 8E:
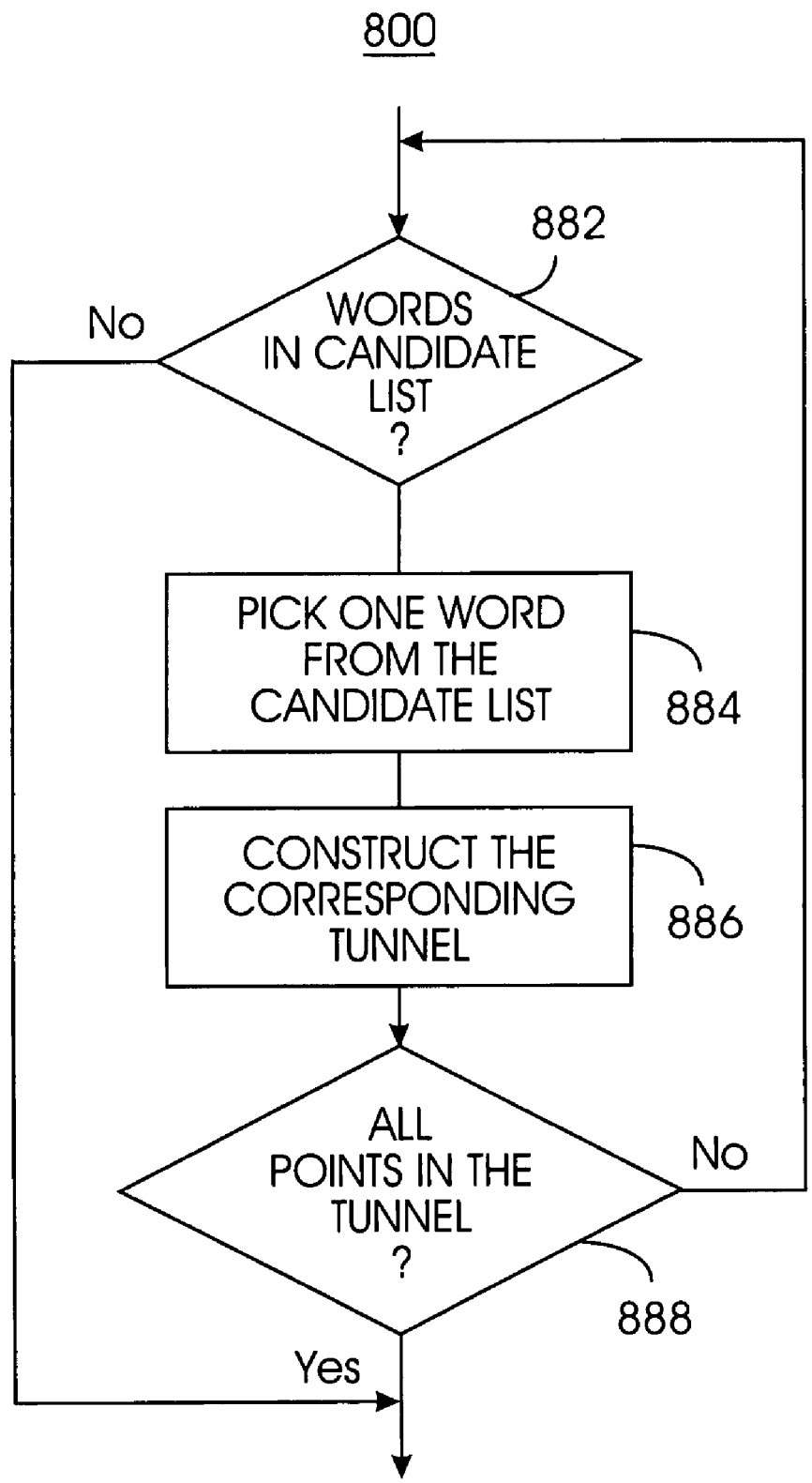

The tunnel model channel 220 uses "tunnel detection" as recognition. If the user literally crosses all letters in a word, that single word is returned regardless the shape of the shorthand gesture. Consequently, a tunnel model of the word is applied to the shorthand gesture before any more sophisticated recognition takes place. The tunnel model for each word in lexicon 225 is constructed by connecting the letters of the word with a predefined width (e.g. one key wide). The tunnel model channel 220 examines the letter sequence crossed by the user's shorthand gesture. If some of those keys in the correct order form a word in the lexicon 225, that word is a candidate word regardless the shape of the gesture. A two-stage fast matching algorithm used by the tunnel model channel 220 is illustrated in FIGS. 8D and 8E.

To eliminate false positives, the tunnel model channel 220 performs an exhaustive search to verify that all the points in the shorthand gesture indeed fit the tunnel model of the candidate word. This verification can be performed by verifying that each point in the shorthand gesture is within the radius of one of the points in the corresponding evenly interpolated word pattern. If this process returns a single word, the tunnel model channel 220 determines that the user has traced that word and this traced word is sent to text output 240 without further investigation.

If more than one word is selected by the tunnel model channel 220, all candidate words are sent to the integrator 230. The integrator 230 applies the standard recognition process to those words in an attempt to disambiguate them. If no candidate words are returned, the standard recognition process is applied on all templates using information provided by the shape channel 210 and location channel 215.

Figure 5A:
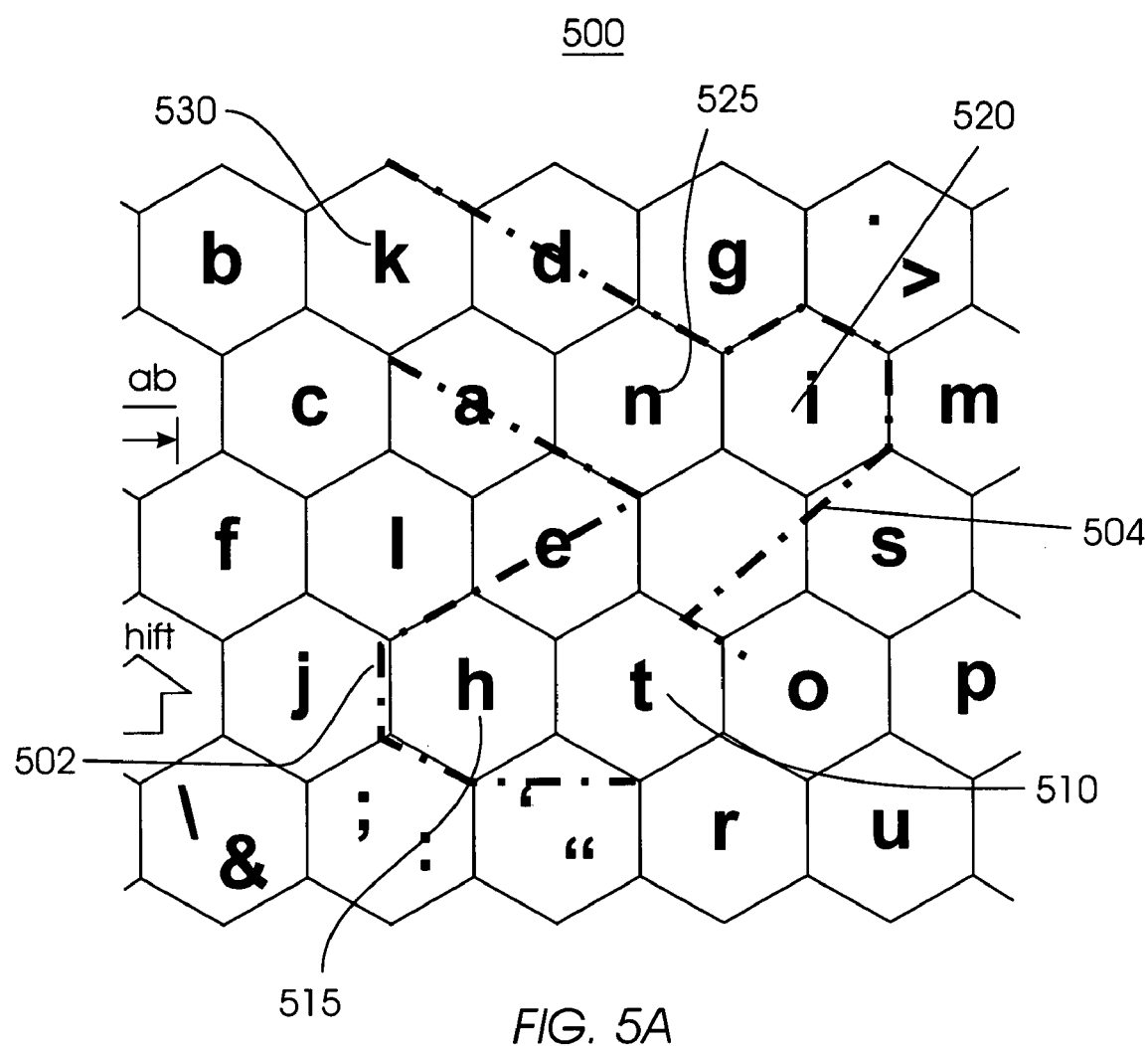
Figure 5B:
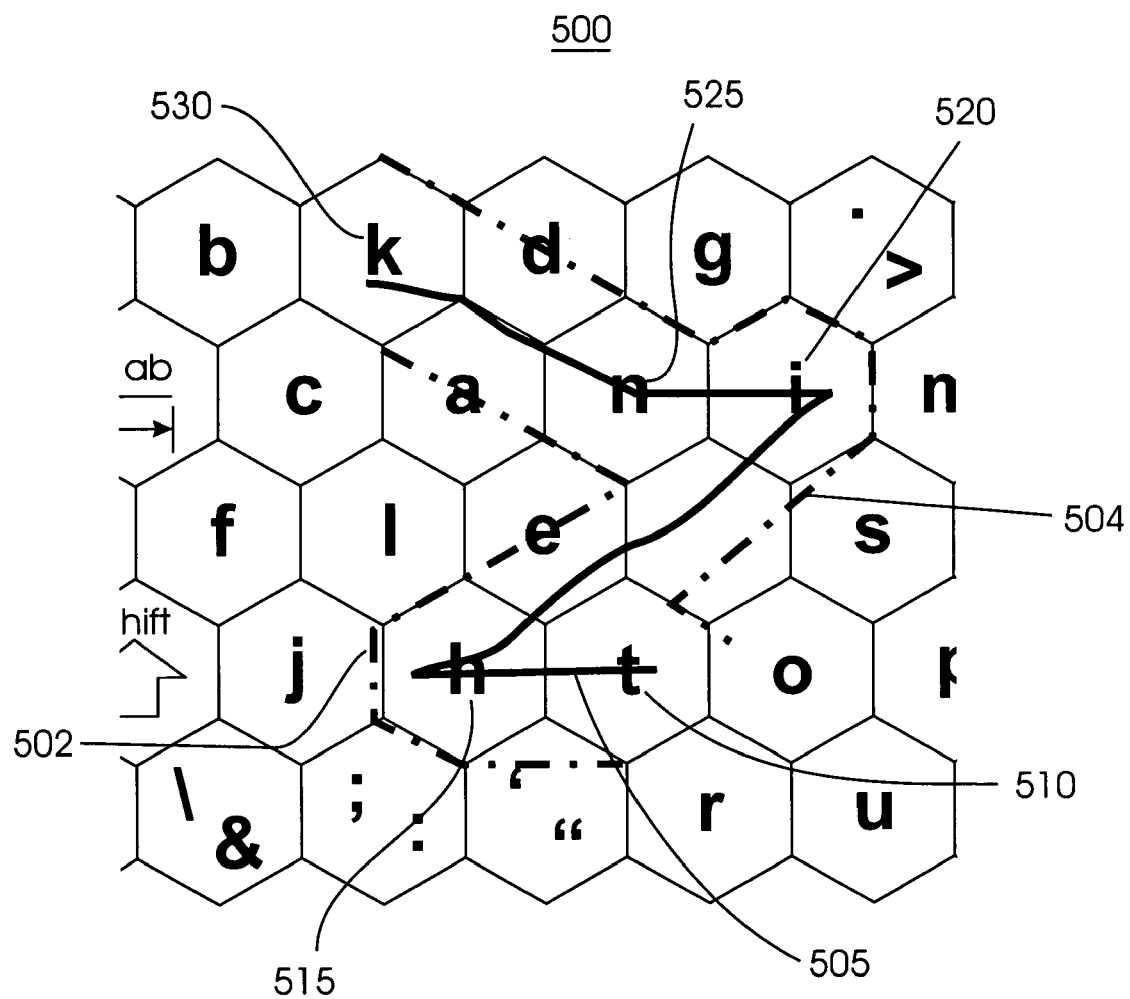
Figure 5C:
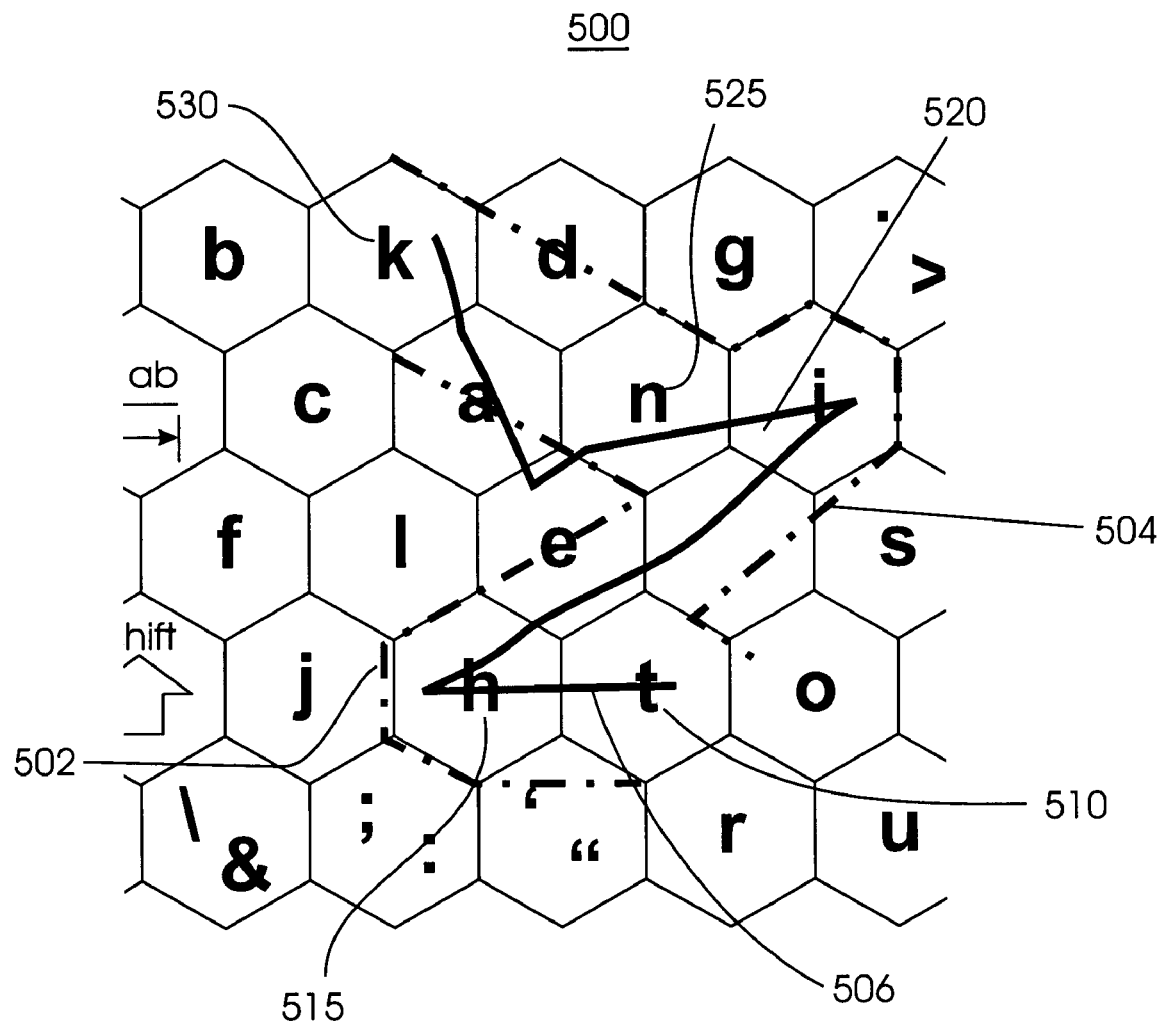
FIG. 5C shows an invalid gesture that goes cross the boundary of the "virtual tunnel" hence is not a valid input of word "think" under tunnel model.

FIG. 5A illustrates the virtual tunnel for the word "think" on a keyboard 500. The hard boundaries 502 and 504 of the tunnel are defined by connecting the outline of virtual "t" key 510, "h" key 515, "I" key 520, "n" key 525 and "k" key 530. FIG. 5B shows a valid gesture 505 confined within the "think" tunnel. The gesture 505 traverses the tunnel defined by boundaries 502 and 504 from virtual key "t" 510, "h" key 515, "I" key 520, "n" key 525, "k" key 530 in the correct order without going outside any of the boundaries. Consequently, gesture 505 is a valid gesture for the virtual tunnel "think", and the result "think" will be returned by the tunnel model. In comparison, FIG. 5C shows a invalid gesture 506 for the virtual tunnel "think". Gesture 506 traverses the tunnel boundary 502 when 506 crosses virtual key "n" 525. Therefore, gesture 506 is not a valid gesture input for the virtual tunnel "think".

The integrator 230 applies a series of selective classifiers serially on the input to the integrator 230. An example of a selective classifier is the tunnel model channel 220. Other selective classifiers may be used by the word pattern recognition system 10. If any of these selective classifiers (e.g., the tunnel model channel 220) are able to select a single candidate word for the shorthand gesture, that single candidate word is sent to the text output 240. Otherwise, integrator 230 applies the input provided by parallel channels such as the shape channel 210 and location channel 215. Other parallel channels may be used to provide further input to the integrator 230 for selecting candidate words for the shorthand gesture. The integration performed by integrator 230 results in an N-best list of candidate words for the shorthand gesture.

To integrate the inputs from the shape channel 210, the location channel 215, and any other channels, integrator 230 converts the inputs or "scores" or matching distances to probabilities. A number of methods can be used for this conversion from scores to probabilities. In an embodiment, integrator 230 uses the following method to perform this conversion from scores to probabilities.

The output of the shape channel 210 (or score) for word i is denoted as $x_s(i)$. Similarly the output of the location channel 215 (or score) is denoted as $x_l(i)$. For each channel such as the shape channel 210 and the location channel 215, integrator 230 converts a score x(i) for template i to a score y(i)∈[0,1]:

$$y(i)=e^{-x(i)/\theta} \qquad (7)$$

where y is a variable between 0 (x is infinite) and 1 (x=0). Integrator 230 uses equation (7) because of the nature of the distance score distributions in the channels. In addition, equation (7) is a non-linear transformation that gives integrator 230 scores from 0 to 1 with a weighting coefficient θ that can be empirically adjusted or trained.

Integrator 230 uses θ to weigh the contribution of each channel such as the shape channel 210 and the location channel 215. As θ increases, y decreases. Lower values of y indicate that a channel such as the shape channel 210 and the location channel 215 is more discriminative. θ is also defined relative to the dimension x. The word pattern recognition system 10 specifies a pruning threshold at x=3θ; this is the maximum mismatch beyond which there is little chance the word i matches the shorthand gesture. At x>3θ, y<0.04.

From y(i), integrator 230 can prune those word candidates for the shorthand gesture whose y(i) score is below, for example, 0.04. Integrator 230 thus prunes the candidates from the entire lexicon 225 (L) to a subset W before computing equation (7). Pruning may also be performed earlier by the separate channels to reduce computation. For example, in the process of computing the shape similarity score x, a candidate word for the shorthand gesture can be abandoned by the shape channel 210 as soon as the mismatch surpasses 3θ.

In an alternative embodiment, θ may be dynamically adjusted by comparing the time the user spent on producing the shorthand gesture and the estimated time it takes to produce a visually guided close-loop word pattern within the key boundaries. Such a calculation can be achieved before comparing the shorthand gesture with the template.

In another alternative embodiment, θ may be dynamically adjusted by calculating the total normative time of writing the pattern of word i:

where $D_{k,k+1}$ is the distance between the $k^{th}$ and the $(k+1)^{th}$ letters of word i on the keyboard; W is the key width, n is the number of letters in the word; and a and b are two constants in Fitts' law. In the context of virtual keyboard, the values of constants a and b are estimated at a=83 ms, b=127 ms. Reference is made to Accot, J., and Zhai, S., "More than dotting the i's—foundations for crossing-based interfaces," Proc. CHI. 2002, pages 73-80; and to Zhai, S., Sue, A., and Accot, J., "Movement model, hits distribution and learning in virtual keyboarding," Proc. CHI. 2002, pages 17-24.

Once $t_n(i)$ for each word and the total time of the actual gesture production $t_a$ are determined, it is then possible to modify the probability calculated from the location based classifier. This information could be used to adjust the θ value with in the following equation:

if $t_a \leq t_n(i)$, $\theta_L = \theta$

This means that the actual time is greater than the Fitts' law prediction. The user could be taking time to look for the keys. No adjustment is needed in this case.

If $t_a \leq t_n(i)$, $\theta_L = \theta(1 + \gamma \log_2(t_n(i)/t_a))$

For example, if $t_a$ is 50% of $t_n(i)$, θ will increase by 100γ percent, γ is an empirically adjusted parameter, expected to be between 1 and 10.

It should be noted that this approach is more than simply adjusting the relative weight between the location and the non location channels. It modifies the location based channels' probability of each individual word according to its path on the keyboard.

Integrator 230 calculates the probability of word i based on x provided by the shape channel 210 and the location channel 215 for those candidate words for the shorthand gesture that have not been pruned (i∈W):

$$p(i) = \frac{y(i)}{\sum_{i \in W} y(i)} \qquad (8)$$

With the probability $p_s$ from the shape channel 210 and $p_l$ from the location channel 215, integrator 230 selects or integrates the candidate words from the shape channel 210 and the location channel 215. For example, a channel such as the shape channel 210 has one candidate whose probability is close to 1. The location channel 215 has more than one candidate word; consequently, no candidate words have probabilities close to 1. Integrator 230 then selects the candidate word from the shape channel 210 based on the relatively high probability of that candidate word.

The shape channel 210 and location channel 215 may each have multiple candidate words. Integrator 230 then integrates the candidate words from the shape channel 210 and location channel 215 into a final N-best list, with a probability for each candidate word as:

$$p(i) = \frac{p_s(i)p_l(i)}{\sum_{j \in W_s \cap W_l} p_s(j)p_l(j)} \qquad (9)$$

The final N-best list of candidate words can be further narrowed by integrator 230 with input from the language model channel 235. Template patterns are defined by tracing the keys on a keyboard; consequently, some words have identical templates. For example, on the ATOMIK keyboard layout shown in FIG. 3, the words "an" and "aim" are ambiguous even when location is taken into account. In addition, the words "can", "an", and "to" are identical when scale and location are ignored. The same is true for the words "do" and "no". Some words are ambiguous on any keyboard layout. For example, words that have a single letter repeated such as "to" and "too" have identical templates. Integrator 230 with input from the language model channel 235 resolves these ambiguities automatically with commonly used speech recognition methods.

On occasion, the word pattern recognition system 10 selects a word for the shorthand gesture that is not the word intended by the user, either due to ambiguity in recognizing the word or due to sloppiness of the shorthand gesture entered by the user. In this case, the first candidate word on the N-best list of candidate words most likely is not the desired word. In an embodiment, the user can tap on a virtual key on the virtual keyboard that changes the selected word to the next most probable word on the n-base list of candidate words. The user can scroll through the N-bet list of candidate words by tapping on this virtual key until the desired word is selected.

In another embodiment, the word pattern recognition system 10 uses a pie menu to display the top N (e.g. 6) choices in the N-best list of candidate words. The pie menu may be displayed, for example, when the user lands a stylus either on a special key or on the word displayed in the application window. The user can slide the stylus to the sector in which the intended word is located. In a further embodiment, the choice "Delete Word" as a command is also an item in the pie menu. Consequently, a user can erase the shorthand gesture when none of the candidates presented match the word intended by the user.

Figure 6A:
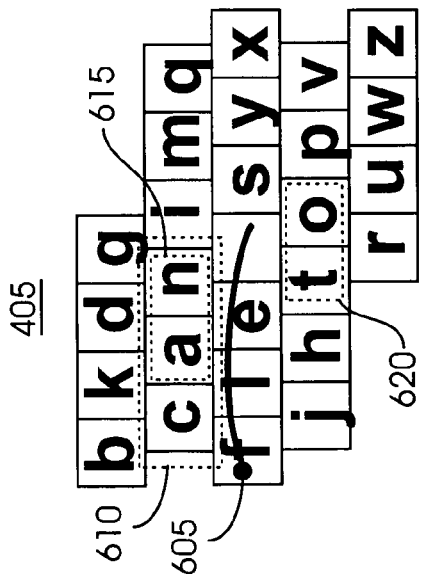
FIG. 6 is comprised of FIGS. 6A, 6B, 6C, and 6D, and represents an exemplary keyboard diagram illustrating one approach in which the word pattern recognition system of FIGS. 1 and 2 resolves ambiguity in shorthand gestures.
Figure 6B:
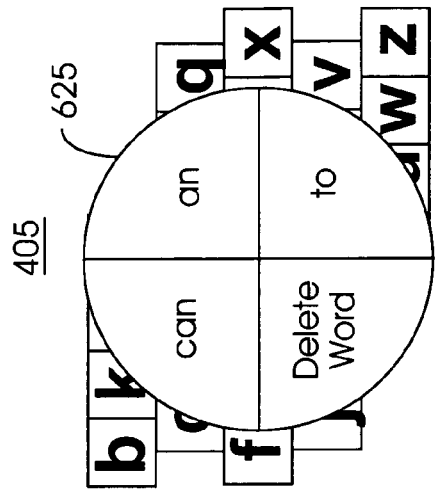
Figure 6C:
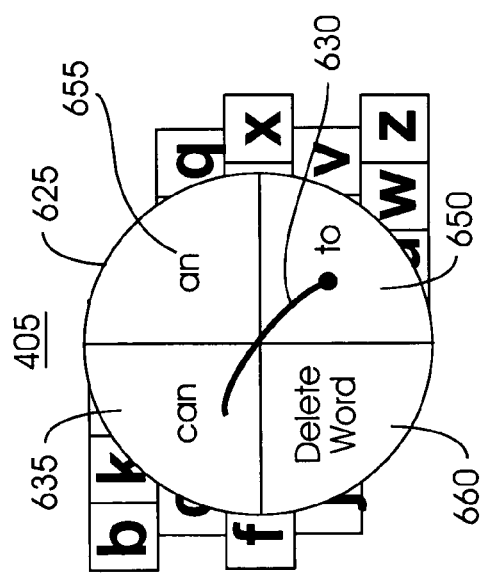
Figure 6D:
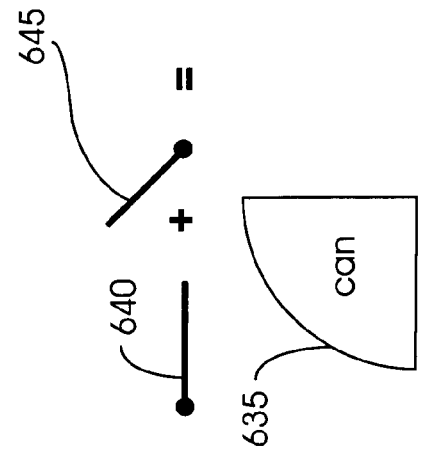

The use of pie menus is illustrated in FIG. 6 (FIGS. 6A, 6B, 6C, 6C). On virtual keyboard 405, the user gestures for the word "can" a stroke 605 from left to right. Stroke 605 does not need to be gestured over the actual letters c-a-n 610. Rather, stroke 605 can be gestured at any location on the virtual keyboard 405 so long as the stroke 605 connects the three letters c-a-n in the appropriate shape. While the present invention is described in terms of a pie menu for exemplification purpose only, it should be clear that other known or available menus can alternatively be used, such as a linear menu.

The word pattern recognition system 10 finds more than one match to the gesture or stroke 605, c-a-n 610, a-n 615, and t-o 620 (FIG. 6A). In response, the word pattern recognition system 10 displays a pie menu 625 (FIG. 6B) with these candidate words in a consistent order. A user inexperienced with this particular ambiguous word looks at the pie menu 625 and makes a straight stroke 630 (FIG. 6C) in the direction of the desired candidate "can" 635 on the pie menu 625, independent of location. With experience, the user does not have to look at the pie menu 625 because the candidates are presented in a consistent segment of the pie menu 625.

The selection of choice depends on direction only, regardless the location of the stroke. If the pie segments obey a consistent ordering, an experienced user may simply remember the second stroke as part of the shorthand for that word. For example, a right horizontal stroke 640 (FIG. 6D) followed by a stroke 645 to the upper-left direction is always the word "can" 635. Similarly, left and down is always the word "to" 650 and a left stroke followed by a stroke to the upper right is always the word "an" 655. The user may delete the pie menu 625 and the shorthand gesture 605 by selecting "Delete Word" 660.

The word pattern recognition system 10 uses several feedback methods to ease the cognitive load of the user. In an embodiment, text output 240 displays the highest probability candidate word on the virtual keyboard, near where the stylus lifts. This position is chosen since it is in the most likely area where the user will look. The display of the highest probability candidate word at this position enables the user to know if the highest probability candidate word is the desired word without necessarily looking at a separate output window. The highest probability candidate word can be displayed in predetermined color, in high contrast to the virtual keyboard. The highest probability candidate can also be displayed in a color that varies according to the probabilities of the candidate word for the shorthand gesture.

All words in lexicon 225 have a single template representation. As a useful feedback to the user, the text output 240 can indicate to the user how far the shorthand gesture diverges from the template of the recognized word. Similarity is measured using spatial distance. Consequently, the word pattern recognition system 10 can perform a mapping between the shorthand gesture and the template that is displayed by text output 240. The shorthand gesture is gradually transformed or "morphed" to the template shape using a morphing process. Since this is a dynamic process, the user can see which parts of a shape least match the template and adjust future shorthand gestures for that word to more closely match the template.

The word pattern recognition system 10 applies the morphing process to the points of the shorthand gesture and the word template. The term p denotes [x y] and S represents the desired number of morphing steps, i.e., how many intermediate transformed shapes are to be rendered. A source pattern and a target pattern are sampled to have an equidistant equal amount of N sample points. Consequently, for a given source point $p_s$ and a given target point $p_t$ the intermediate morphing point $p_m(i)$ at step i, $0 \leq i \leq S$ can be identified by connecting a line between $p_s$ and $p_t$, and searching the point at the distance L(i) on the line:

$$p_m(i) = p_s + [L(i)\cos\theta \quad L(i)\sin\theta] \text{ where} \quad (10)$$

$$L(i) = id(i) \text{ and} \quad (11)$$

$$d(i) = \frac{\|p_s - p_t\|_2}{S} \quad (12)$$

FIG. 7 (FIGS. 7A, 7B, 7C, 7D, 7E, 7F, 7G, 7H, 7I) shows the word "system" written in a virtual keyboard 700 by the text output 240. On a virtual keyboard 700, the word pattern recognition system 10 morphs the shorthand gesture 705 (FIG. 7A) to the ideal template 710 (FIG. 7I) over time, as represented by gesture shapes 715, 720, 725, 730, 735, 740, 745. In an embodiment, the word pattern recognition system 10 places a word 750 for which the shorthand gesture is being morphed (i.e., "system") on the virtual keyboard with the morphing gesture shapes 715, 720, 725, 730, 735, 740, 745. The animation of gesture shapes 715, 720, 725, 730, 735, 740, 745 can be made arbitrarily smooth by adjusting S. The display of shorthand gesture 705, gesture shapes 715, 720, 725, 730, 735, 740, 745, and the ideal template 710 fades away slowly over time, or disappears as soon as the user places the stylus to begin the next shorthand gesture.

In an embodiment, the word pattern recognition system 10 identifies separate line segments and curvature areas in the shorthand gesture. Reference is made to Duda, R. O., and Hart, P. E., "Pattern Classification and Scene Analysis," 1973, John Wiley & Sons, pages 328-341. The text output 240 morphs these line segments and curvature areas individually to the corresponding segments in the word template. This approach gives the user a better grasp of which segments in the shorthand gesture least matched the word template.

The contributions of the shape channel 210 and the location channel 215 are different depending on how the user performed the shorthand gesture. Consequently, user feedback from the word pattern recognition system 10 models this behavior. The word pattern recognition system 10 translates and scales the template to the central shorthand gesture point and size if the shorthand gesture was recognized as the output word based on output from the shape channel 210.

If the word pattern recognition system 10 recognizes the output word based on location information (i.e., from the location channel 215 or tunnel model channel 220), the shorthand gesture is morphed into the template projected on the corresponding virtual keys in a virtual keyboard layout. In this manner, the feedback system of the word pattern recognition system 10 emphasizes how the user can improve the writing of the shorthand gesture to produce more easily recognized shapes for the given mode.

In an embodiment, the text output 240 colors points on the morphed shorthand gesture differently based on how closely the point in the shorthand gesture matches the word template. In a further embodiment, the text output 240 colors segments and curvatures of the morphed shorthand gesture differently based on how closely the segment or curvature matches the word template. By coloring portions of the shorthand gesture differently, the feedback system of the word pattern recognition system 10 emphasizes the portions of the shorthand gesture that were least like the template, helping the user refine the shorthand gesture and enhancing the learning process.

In another embodiment, the word pattern recognition system 10 uses integrator 230, language model channel 235, and lexicon 225 to automatically connect word fragments. The shorthand gesture for longer words may become complex or tedious to completely trace. To mitigate this issue, the word pattern recognition system 10 recognizes certain parts of a word and connects them into a syntactically correct word using word stems, their legal suffixes, and connection rules stored in lexicon 225. For example, if the user writes "compute" and then "tion", the integrator 230 can connect the parts into "computation".

When a suffix is detected by integrator 230, integrator 230 obtains the previous word from the language model channel

235. If the previous word and the suffix match, they are connected according to rules in the lexicon 225. The rules can be any set of instructions feasible for connecting a word stem and a suffix. For example, the rule for connecting "compute" and "tion" is to delete the previous character (e.g., "e"), insert "a", and insert the suffix.

On occasion, a suffix does not appear to match the highest probability candidate word for the shorthand gesture. In an embodiment, the word pattern recognition system 10 stores the N-best lists of candidate words. If the probability for a suffix is high but the highest probability candidate word does not match in lexicon 225, integrator 230 traverses the stored N-best list of candidate words for a word with high probability that does match and augment that word with the suffix. Conversely, if the probability of the suffix is low and the probability of the candidate word is high, the word pattern recognition system 10 traverses the N-best list of candidate words for another suffix that can be connected. The word pattern recognition system 10 may then find a more appropriate suffix or determine that the shorthand gesture is a word rather than a suffix.

In a further embodiment, the word pattern recognition system 10 can connect words with multiple suffixes. For example, the word "computational" may be seen as a stem "computa" followed by two suffixes "tion" and "al". The integrator 230 uses a recursive lookup scheme to resolve the correct action. In the case of ambiguity, the N-best lists candidates of the word fragments may be used to find the most likely combination sequence. The word pattern recognition system can use grammatical rules or n-gram techniques to further determine the most likely sequence of stems and suffixes. This approach could also be extended to prefixes, as a prefix may be followed by a stem and the result will be a concatenation.

The process flow chart of FIG. 8 (FIGS. 8A, 8B, 8C, 8D, and 8E) illustrates a method 800 of the word pattern recognition system 10. At block 802, the user forms a stroke on a virtual keyboard. The stroke can be short, as in a tap, or long, as in a shorthand gesture.

The word pattern recognition system 10 captures and records the stroke at step 804. At decision step 806, the word pattern recognition system 10 determines whether the stroke or mark was short. If yes, the user is in tapping mode (step 808) and the word pattern recognition system 10 is instructed to select letters individually on the virtual keyboard. The word pattern recognition system 10 correlates the user's tap with a letter by matching the location of the mark with keyboard coordinates at step 810, and by generating one letter at step 812. System 10 then returns to step 802 when the user forms another stroke.

If at decision step 806 the user's stroke on the virtual keyboard is not short, the user is in shorthand gesturing mode (step 814). The gesture interface 205 produces a normalized shorthand gesture with respect to shape and location while retaining a copy of the original shorthand gesture. These are used as data by the various channels later on. The tunnel model channel 220 uses a two-stage fast-matching algorithm to determine satisfactory words from the large lexicon 225, efficiently and effectively. At the first fast matching step 818, the tunnel model channel 220 compares the original shorthand gesture with templates in lexicon 225. If all the characters in a known word can match sequentially with the set of letters through which the shorthand gesture passes, that word is selected by this fast matching step 818. Then at the second step 820, all the candidates from step 818 are verified to test whether the gesture exceed the tunnel boundaries of the corresponding words in lexicon 225. The tunnel model channel selects all the satisfactory words as candidate words for the shorthand gesture in step 822 (FIG. 8B).

FIG. 8D is a detailed description of the step 818. This is the first stage of the two-stage fast-matching algorithm used by tunnel model 220. The goal of this stage is to find all the possible words passed by the users gesture without considering whether the gesture goes outside of the virtual tunnel. In step 872, captured points from input gesture are translated to raw trace characters 817 one by one, according to the virtual button at which the point is located. Thereafter, in step 874, adjacent duplicate characters as well as none alphabetic characters in the raw string 871 are removed to generate the trace string 873. At step 876, each of the words in lexicon 225 is matched with the trace string 873 to verify whether all the characters of a word appears in the trace string sequentially. If yes, in step 878 tunnel model 210 saves that word in the candidate list.

FIG. 8E is a detailed description of step 820, at step 884, the system picks up words from candidate lists generated in step 818, then constructs corresponding tunnel models for them at 886. At step 888, each point in the input gesture is checked to determined whether it stays within a word tunnel. If yes, that word is selected as an output of the tunnel model.

The tunnel model channel 220 outputs all candidate words for the shorthand gesture to the integrator 230 at step 824. If only one candidate word is found at decision step 826, that candidate word is that word is a recognized word (unique match) and is determined to match the shorthand gesture. Processing then proceeds to decision step 828 (FIG. 8C). If the word is not a suffix at decision step 830 (as determined by applying language rules from the language model channel 235), the integrator 230 outputs the word to the text output 240 and transmits the word to the language model channel 235 for storage (step 832). A word has now been selected for the shorthand gesture, all other processing of the shorthand gesture stops, and operation returns to step 802 when the user initiates another stroke on the virtual keyboard.

If at decision step 828 the selected word is a suffix, the integrator 230 applies connection rules to connect the suffix with the previous word at step 832. The connected word is then output to text output 240 and stored in the language model channel 235 at step 830. A word has now been selected for the shorthand gesture, all other processing of the shorthand gesture stops, and operation returns to step 802 when the user initiates another stroke on the virtual keyboard.

If more than one candidate word was found by the tunnel model channel 220 at decision step 826, the integrator 230 selects a best-matched word using input from the language model channel 235 (step 834). The language model channel 235 provides recent words and language rules to help the integrator 230 in the selection of the best-matched word. If the result of the selection of the best matched word at step 834 yields only one candidate, the results are not ambiguous (decision step 836) and the integrator 230 proceeds to step 828, step 830, and step 832 as previously described.

If more than one candidate word is found by the tunnel model channel 220 to match the shorthand gesture at decision step 836, the results are ambiguous. In this case, the integrator 230 requires additional information from the shape channel 210 and the location channel 215 to identify candidate words for the shorthand gesture. Location might be helpful to disambiguate since location uses a weighted function of the key position when calculating the location similarity score.

While the tunnel channel model is performing step 822, step 824, and step 826, the location channel 215 determines the relative location of the points within the shorthand gesture and compares the relative location with the templates in lexicon 225 (step 838). The location channel 215 selects words that meet or exceed a matching threshold at step 840 and assigns a match probability for each word selected. At step 840, the location channel 215 may select no words, one word, or more than one word. The word or words selected by the location channel 215 are output to the integrator 230 at step 842.

Similarly, the shape channel 210 determines the normalized shape of the points within the shorthand gesture and compares the normalized shape with the templates in lexicon 225 (step 844). The shape channel 210 selects words that meet or exceed a matching threshold at step 846 and assigns a match probability for each word selected. At step 846, the shape channel 210 may select no words, one word, or more than one word. The word or words selected by the shape channel 210 are output to integrator 230 at step 848.

At step 850, integrator 230 analyzes the inputs from the tunnel model channel 220 (if any), the location channel 215, and the shape channel 210 in conjunction with input from the language model channel 235. Language model is different from other channels in probability representation as it represents the prior probability.

In one embodiment, additional channels may be used to analyze the shorthand gestures. In addition, more than one tunnel model channel 220, location channel 215, shape channel 210, and language model channel 235 may be used to analyze the shorthand gestures. If any one candidate word provided by the tunnel model channel 220, location channel 215, or shape channel 210 has a probability of matching the shorthand gesture that is much higher than the other candidate words, the integrator 230 selects that high probability candidate as the one best word (decision step 852). Processing then proceeds to decision step 828, step 830, and step 832 as described previously.

If at decision step 852 a high probability candidate cannot be identified, the integrator 230 treats the channels as mutually exclusive events and calculates for each entry the posterior probabilities of the channels and presents an N-best list of candidate words to the text output 240 at step 854 (FIG. 8C). The N-best list of candidate words may be presented in a variety of formats such as, for example, a pie-menu, a list menu, etc. "Delete Word" is presented as a user option with the N-best list. If the user does not select "Delete Word" (decision step 856), the user selects the desired word at step 858. Processing then proceeds to decision step 828, step 830, and step 832 as previously described. If the user selects "Delete Word" (decision step 856), the word pattern recognition system 10 deletes the N-best list of candidate words and the shorthand gesture at step 860. Operation returns to step 802 when the user initiates another stroke on the virtual keyboard.

It is to be understood that the specific embodiments of the invention that have been described are merely illustrative of certain applications of the principle of the present invention. Numerous modifications may be made to the system and method for recognizing word patterns based on a virtual keyboard layout described herein without departing from the spirit and scope of the present invention. Moreover, while the present invention is described for illustration purpose only in relation to a virtual keyboard, it should be clear that the invention is applicable as well to any system in which a stylus can be used to form gestures or strokes such as, for example, an electronic white board, a touch screen monitor, a PDA, a cellular phone, a tablet computer, etc, as well as any system that monitors gestures or strokes using, for example, an electronic pen and any system that uses shorthand gestures such as, for example, a court reporting system, dictation system, and so forth.

In addition, while natural English has been described herein as an exemplary language to illustrate the present invention, it should be abundantly clear to those skilled in the art that the present invention is language independent and hence can be extended to other languages. As an example, the keyboard layout can contain an alphabet of a language other than English, such as German, French, or the Chinese piyin alphabet.

Furthermore, the language to which the present invention is applied could be an artificial language. One artificial language could be based on an existing alphabet, such a computer programming language that is based on Roman alphabet. The lexicon can be very specialized and smaller, and hence easier to implement and use. A specialized domain, such as medicine, is an example of this artificial language category. Another category of artificial language could be based on an entirely new alphabet.

What is claimed is:

1. A method of recognizing words, comprising:
accepting a stroke as an input on a virtual keyboard coupled to a computer, the computer programmed to perform the steps of:
defining word patterns of a plurality of known words by a plurality of paths, wherein each path connects elements in the known word on the virtual keyboard, wherein the virtual keyboard comprises virtual keys, each virtual key representing a letter in a word without a temporary target letter being placed adjacent to a location of a stroke;
processing the stroke using a combination of a plurality of channels, each channel selectively measuring a different aspect of a similarity of the stroke to a plurality of possible paths on the virtual keyboard;
converting each different aspect of the stroke's similarity to probability estimates;
a shape channel of the plurality of channels measuring a shape aspect of the stroke, and outputting a probability estimate;
a location channel of the plurality of channels measuring location aspect of the stroke, and outputting a probability estimate, wherein the location channel measures the location aspect of the stroke concurrently with the shape channel measuring the shape aspect of the stroke;
mathematically integrating, using Bayes' theorem, the probability estimates of the plurality of channels to produce integrated probability estimates of candidate words corresponding to the stroke; and
based on the integrated probability estimates of the candidate words, recognizing the stroke as a known word.

2. The method of claim 1, wherein the shape channel outputs normalized shape information independent of location and scale.

3. The method of claim 1, wherein the plurality of channels comprises a tunnel model channel, wherein the tunnel of a word pattern comprises a predetermined width on either side of a set of the virtual keys representing a set of letters of a word on the virtual keyboard, and wherein the tunnel model channel is applied to the stroke before any other channel is applied to the stroke.

4. The method of claim 1, wherein the plurality of channels comprises a language context channel that stores recognized known words, and wherein the language context channel provides clues for recognizing a word based on a stored previously recognized known word.

5. The method of claim 2, wherein recognizing a word pattern using the normalized shape information comprises at least one of: template matching and feature extraction.

6. The method of claim 1, wherein the location channel recognizes a word pattern by sampling a plurality of points on the stroke, including at least one sampling point between a beginning and an end of the stroke, each sampling point having a weight, and by applying weights to sampling points of the stroke, wherein each sampling point has a different weight, and wherein a sampling point at the beginning of the stroke has a greatest weight and a sampling point at the end of the stroke has a least weight.

7. The method of claim 3, wherein recognizing a word pattern using the tunnel model channel comprises traversing keys passed by the word pattern and identifying potential word candidates by partial string matching.

8. The method of claim 3, wherein recognizing a word pattern using the tunnel model channel comprises transforming a tunnel and the stroke passing the tunnel.

9. The method of claim 2, further comprising:
generating an intermediate shape that represents a difference between the stroke and an ideal template of the word pattern by morphing the stroke with an ideal template; and
displaying the intermediate shape.

10. The method of claim 1, further comprising analyzing the stroke to differentiate between a tapping and a shorthand gesture input; and inputting at least one letter of a word by tapping the letter.

11. The method of claim 2, further comprising:
comparing a normalized word pattern and a normalized stroke;
sampling the normalized word pattern to a fixed number of a plurality of points;
sampling the stroke to a same fixed number of a plurality of points;
and measuring the plurality of points relative to each other.

12. The method of claim 9, further comprising:
comparing a feature vector of the stroke with a feature vector of the ideal template of the word pattern;
computing a similarity score from said comparing; and
obtaining a distance measurement between the stroke and the ideal template of the word pattern from said similarity score.

13. A shorthand symbol system for recognizing words, comprising:
a graphical keyboard layout for accepting a stroke as an input, wherein the keyboard layout contains a set of characters forming elements in the word without a temporary target element being placed adjacent to a current stroke location;
a storage for storing word patterns of a plurality of paths, wherein each path connects a set of letters received from the graphical keyboard layout;
a pattern recognition engine that recognizes a word pattern by processing the stroke using a combination of a plurality of channels, each channel selectively processing, in parallel, a different aspect of the stroke in relation to the plurality of the paths on the graphical keyboard layout and producing an output representing a probability estimate for a candidate word, one channel of the plurality of channels processing a location-based similarity probability estimate, another channel of the plurality of channels processing a shape-based similarity probability estimate, still another channel of the plurality of channels processing a path-based similarity probability estimate, and yet another channel of the plurality of channels processing a language context-based similarity probability estimate; and
a computer for producing a probability estimate of a candidate word, wherein the computer produces the probability estimate of the candidate word by first serially applying the output of each channel of the plurality of channels alone and separately, and if a recognized word cannot be identified from the output of any one channel, then the computer mathematically integrates outputs of at least two channels of the plurality of channels to produce an integrated probability estimate of the candidate word.

14. The method of claim 13, wherein the channel that processes a shape-based similarity probability estimate outputs normalized shape information independent of location and scale.

15. The method of claim 13, wherein the one channel of the plurality of channels comprises location information regarding sampling points of the stroke, wherein each sampling point has a different weight.

16. The system of claim 13, wherein the word patterns comprise letters from an alphabet.

17. The system of claim 13, wherein the word patterns comprise letters from Chinese pinyin characters.

18. The system of claim 13, wherein the word patterns are based on a lexicon, and wherein the lexicon comprises a very large collection of words used in a natural language, and wherein words in the lexicon are rank ordered by usage frequency, and more frequent words are given higher a priori probability.

19. The system of claim 13, wherein the word patterns are based on a lexicon, wherein the lexicon is customized from an individual user's previous documents for a specific application, and wherein part of the customized lexicon is based on a computer programming language.

20. The system of claim 13, wherein the word patterns are based on a lexicon, and wherein the lexicon is customized for a specific domain.

21. The method of claim 1, including ranking the candidate words in order of probability.

22. The method of claim 1, including:
determining a time spent inputting the stroke; and
modifying at least one probability estimate according to a path of the stroke on the virtual keyboard and the time spent inputting the stroke, to produce an output of at least one channel of the plurality of channels.

23. A method of recognizing words, comprising: using a computer to perform the steps of:
defining word patterns of a plurality of known words by a plurality of paths, wherein each path connects elements in the known word on a virtual keyboard, wherein the virtual keyboard comprises virtual keys, each virtual key representing a character, each character forming an element in a word;
accepting a stroke as a candidate word inputted on the virtual keyboard;
recognizing a word pattern by processing the stroke using a combination of a plurality of channels, each channel selectively processing a different aspect of the stroke, one channel of the plurality of channels determining a weighted location-based similarity probability estimate from a location-based similarity probability estimate;
determining a time spent inputting the stroke;
modifying the weighted location-based similarity probability estimate according to a path of the stroke on the virtual keyboard and the time spent inputting the stroke, to produce an output of the one channel, wherein modifying further comprises;

calculating a total normative time of inputting the stroke for each word i, as follows:

$$t_n(i) = na + b\sum_{k=1}^{n-1} \log_2\left(\frac{D_{k,k+1}}{W} + 1\right)$$

where $D_{k,k+1}$ is a distance between the $k^{th}$ and the $(k+1)^{th}$ letters of word i on the keyboard; W is a key width, n is a number of letters in the word; and a and b are two constants in Fitts' law, calculating a total normative time of inputting the stroke for all words of a gesture production, as follows:

$$t_a = \Sigma t_n(i)$$

and if $t_a \leq t_n(i)$, then a ratio $t_n(i)/t_a$ is used to adjust distribution of the probability estimates so as to lower the weight of the location channel; and mathematically integrating outputs of the plurality of channels to produce an integrated probability estimate of the candidate word.

24. The method of claim 23, including the step of ranking the candidate words in order of probability.

25. The method of claim 23, wherein another channel of the plurality of channels comprise a tunnel model channel.

26. The method of claim 25, wherein still another channel of the plurality of channels comprise a language context channel.

27. The method of claim 26, wherein yet another channel of the plurality of channels comprises shape information.

28. The method of claim 27, wherein recognizing a word pattern using the shape information comprises template matching.

29. The method of claim 28, wherein recognizing a word pattern using the shape information comprises feature extraction.

30. The method of claim 1, including, prior to mathematically integrating, the steps of:
setting a threshold for probability estimates; and
pruning words whose probability estimates are lower than the threshold.

31. The method of claim 1, wherein the shape channel outputs for each word a probability estimate $x_S(i)$, and wherein the location channel outputs for each word a probability estimate $x_L(i)$, and including, for each word, the step of:
mathematically integrating the probability estimates of the plurality of channels first by producing for each channel a score $$y(i) \in [0,1]: y(i) = e^{-x(i)/\theta},$$

where y is a variable between 0 and 1, and where $\theta$ is a weighting coefficient, and second by adding $y_S(i)$; and $y_L(i)$ such that the sum is an integrated probability estimate $y(i)$ of a candidate word.

32. The method of claim 31, including pruning all scores $y(i) < 0.04$ prior to adding $y_S(i)$ and $y_L(i)$.

33. The method of claim 31, including the steps of:
setting a threshold for probability estimates;
pruning words whose probability estimates are lower than the threshold;
calculating a probability p of a word i based on values of $x_S$ and $x_L$ provided by the shape channel and the location channel, respectively, for those candidate words for the stroke that have not been pruned (i∈W) as follows, $$p(i) = \frac{y(i)}{\sum_{i \in W} y(i)} \text{ and}$$

after calculating $p_S$ from the shape channel and $p_L$ from the location channel, integrating candidate words from the shape channel and the location channel as follows, $$p(i) = \frac{p_s(i)p_l(i)}{\sum_{j \in W_s \cap W_l} p_s(j)p_l(j)}$$

where $p_S$ is the probability estimate from the shape channel, $p_L$ is the probability estimate from the location channel, $W_S$ is a set of candidate words outputted from the shape channel, and $W_L$ is a set of candidate words outputted from the shape channel.

34. The method of claim 1, wherein the location channel places varied weights on different sampling points of the stroke as follows:

$$x_L(i) = \sum_{k=0}^{N} \alpha(k)d_2(k)$$

where $\alpha(k)$ is a relative weight placed on a $k^{th}$ sampling point of the stroke (from k=0 to k=N), where $d_2$ is a distance between a point of the stroke and a corresponding point of a template, and where $x_L(i)$ is a probability estimate that the stroke is word i intended by a user who makes the stroke.

35. The method of claim 34, wherein $\alpha(k)$ is calculated as follows:

$$\alpha(k) = \frac{N - k(1-\beta)}{(1+N)N - (1-\beta)\sum_{k=1}^{N} k} \text{ where } \beta = \alpha(0)/\alpha(N),$$

and where $\alpha(0) + \alpha(1) + \alpha(2) + \ldots + \alpha(k) + \ldots + \alpha(N) = 1.$ 36. The method of claim 3, wherein the tunnel model channel includes two stages, a first stage generates a small candidate list efficiently by partial string matching, and a second stage verifies the word candidate by checking whether all of the points in a stroke falls into a virtual tunnel.

37. The method of claim 36, wherein the first stage of the tunnel model channel includes
a first step that sequentially compares all the characters in the stroke with all the characters in templates in a lexicon to match all the characters in the known word,
a second step in which captured points from the stroke are translated to raw trace characters one by one, according to the virtual button at which the point is located,
a third step in which adjacent duplicate characters as well as none alphabetic characters in the raw trace characters are removed to generate a trace string, and
a fourth step in which each of the words in the lexicon is matched with the trace string to verify whether all the characters of a word appears in the trace string sequentially, and if so, the tunnel model channel saves that word in a word candidate list.

38. The method of claim 37, wherein the second stage of the tunnel model channel includes a first step that constructs a corresponding tunnel model for each word in the word candidate list, a second step in which all the words in the word candidate list are tested to determine whether the stroke exceed the tunnel boundaries of a corresponding known word, and a third step in which each point in the stroke is checked to determine whether it stays within a word tunnel, and if so, that word is selected as an output of the tunnel channel model.

39. The method of claim 23, wherein the step of recognizing includes determining a weighted location-based similarity probability estimate y(i) from a location-based similarity probability estimate x(i), as follows $$y(i) \in [0,1]; y(i) = e^{-x(i)\theta},$$

where y is a variable between 0 and 1, and where $\theta$ is a weighting coefficient.

* * * * *